United States Patent
Lee et al.

(10) Patent No.: US 12,004,122 B2
(45) Date of Patent: Jun. 4, 2024

(54) METHOD AND TERMINAL FOR TRANSMITTING APERIODIC SIGNAL IN WIRELESS COMMUNICATION TERMINAL

(71) Applicant: LG Electronics Inc., Seoul (KR)

(72) Inventors: Seungmin Lee, Seoul (KR); Hyukjin Chae, Seoul (KR); Kyuhwan Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 643 days.

(21) Appl. No.: 17/267,737

(22) PCT Filed: Aug. 12, 2019

(86) PCT No.: PCT/KR2019/010207
§ 371 (c)(1),
(2) Date: Feb. 10, 2021

(87) PCT Pub. No.: WO2020/032766
PCT Pub. Date: Feb. 13, 2020

(65) Prior Publication Data
US 2021/0321370 A1    Oct. 14, 2021

(30) Foreign Application Priority Data
Aug. 10, 2018   (KR) .................... 10-2018-0093917

(51) Int. Cl.
*H04W 72/02*    (2009.01)
*H04W 4/40*    (2018.01)
(Continued)

(52) U.S. Cl.
CPC ............. *H04W 72/02* (2013.01); *H04W 4/40* (2018.02); *H04W 72/0446* (2013.01);
(Continued)

(58) Field of Classification Search
None
See application file for complete search history.

(56) References Cited

U.S. PATENT DOCUMENTS

| 2016/0295624 A1 | 10/2016 | Novlan et al. |
| 2019/0143936 A1* | 5/2019 | Abel Rayan ............ B60R 25/10 701/2 |

(Continued)

FOREIGN PATENT DOCUMENTS

| KR | 1020180030337 | 3/2018 |
| KR | 1020180038060 | 4/2018 |

(Continued)

OTHER PUBLICATIONS

PCT International Search Report and Written Opinion in International Appln. No. PCT/KR2019/010207, dated Nov. 27, 2019, 19 pages (with English translation).

*Primary Examiner* — Jenkey Van
(74) *Attorney, Agent, or Firm* — Fish & Richardson P.C.

(57) ABSTRACT

One embodiment of the present disclosure provides a method for transmitting, by a receiving terminal, a feedback signal to a transmitting terminal in a wireless communication system, the method comprising a step of: receiving, by the receiving terminal, a reference signal from the transmitting terminal; and transmitting, by the receiving terminal, the feedback signal for the reference signal to the transmitting terminal, wherein the feedback signal is transmitted on the basis of compensation for a phase change that occurs when the reference signal is received. The UE is capable of communicating with at least one of another UE, a UE related to an autonomous driving vehicle, a base station or a network.

11 Claims, 19 Drawing Sheets

(51) Int. Cl.
*H04W 72/0446* (2023.01)
*H04W 72/0453* (2023.01)
*H04W 72/20* (2023.01)
*H04W 74/0808* (2024.01)

(52) U.S. Cl.
CPC ....... *H04W 72/0453* (2013.01); *H04W 72/20* (2023.01); *H04W 74/0808* (2013.01)

(56) References Cited

U.S. PATENT DOCUMENTS

2020/0029340 A1* 1/2020 He .................... H04W 76/14
2021/0243749 A1* 8/2021 Hoang ................ H04W 74/085
2021/0306828 A1* 9/2021 Panteleev ......... H04W 72/0446

FOREIGN PATENT DOCUMENTS

KR 1020180042034 4/2018
WO WO2017176099 10/2017

\* cited by examiner (a) DMRS location for Rel. 12/13 PSBCH (b) DMRS location for V2V PSBCH (a)

(b)

(a)

(b)

METHOD AND TERMINAL FOR TRANSMITTING APERIODIC SIGNAL IN WIRELESS COMMUNICATION TERMINAL

CROSS-REFERENCE TO RELATED APPLICATIONS

This application is a National Stage application under 35 U.S.C. § 371 of International Application No. PCT/KR2019/010207, filed on Aug. 12, 2019, which claims the benefit of Korean Application No. 10-2018-0093917, filed on Aug. 10, 2018. The disclosures of the prior applications are incorporated by reference in their entirety.

TECHNICAL FIELD

The present disclosure relates to a wireless communication system, and more particularly to a method for transmitting aperiodic signals, and a user equipment (UE) for the same.

BACKGROUND ART

As more and more communication devices demand larger communication capacities, the need for enhanced mobile broadband communication relative to the legacy radio access technologies (RATs) has emerged. Massive machine type communication (mMTC) that provides various services by interconnecting multiple devices and things irrespective of time and place is also one of main issues to be addressed for future-generation communications. A communication system design considering services/user equipments (UEs) sensitive to reliability and latency is under discussion as well. As such, the introduction of a future-generation RAT considering enhanced mobile broadband (eMBB), mMTC, ultra-reliability and low latency communication (URLLC), and so on is being discussed. For convenience, this technology is referred to as new RAT (NR) in the present disclosure. NR is an exemplary 5th generation (5G) RAT.

A new RAT system including NR adopts orthogonal frequency division multiplexing (OFDM) or a similar transmission scheme. The new RAT system may use OFDM parameters different from long term evolution (LTE) OFDM parameters. Further, the new RAT system may have a larger system bandwidth (e.g., 100 MHz), while following the legacy LTE/LTE-advanced (LTE-A) numerology. Further, one cell may support a plurality of numerologies in the new RAT system. That is, UEs operating with different numerologies may co-exist within one cell.

Vehicle-to-everything (V2X) is a communication technology of exchanging information between a vehicle and another vehicle, a pedestrian, or infrastructure. V2X may cover four types of communications such as vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

SUMMARY

An object of the present disclosure is to provide a method for selecting resources when aperiodic traffic occurs in UE-to-UE direct communication.

It will be appreciated by persons skilled in the art that the objects that could be achieved with the present disclosure are not limited to what has been particularly described hereinabove and the above and other objects that the present disclosure could achieve will be more clearly understood from the following detailed description.

In accordance with an aspect of the present disclosure, a method for allowing a first user equipment (UE) to transmit a signal in a wireless communication system may include selecting, by the first user equipment (UE), at least one candidate resource group from among a plurality of candidate resource groups each including at least one subchannel needed to transmit an aperiodic signal, and transmitting, by the first user equipment (UE), the aperiodic signal to a second user equipment (UE) using the at least one candidate resource group, wherein the at least one candidate resource group is selected based on a sensing result of the first user equipment (UE) associated with the plurality of candidate resource groups.

The selecting at least one of the plurality of candidate resource groups may include selecting, by the first user equipment (UE), a candidate resource group other than a candidate resource group colliding with resources needed to transmit a periodic signal, from among the plurality of candidate resource groups.

The aperiodic signal may include control information and data information. Time resources needed to transmit the control information may be transmitted earlier than time resources needed to transmit the data information. A candidate resource group needed to transmit the control information may be established differently from a candidate resource group needed to transmit the data information.

The control information may be transmitted through a physical sidelink control channel (PSCCH). The data information may be transmitted through a physical sidelink shared channel (PSSCH). A reference signal received power (RSRP) of the PSSCH may be calculated based on a reference signal received power (RSRP) of the PSCCH.

The RSRP of the PSCCH may be calculated in consideration of a ratio of a size of resources needed to transmit the PSCCH to a size of resources needed to transmit the PSSCH.

The RSRP of the PSSCH may be calculated in consideration of at least one of transmission (Tx) power of the PSCCH, transmission (Tx) power of the PSSCH, and a ratio of transmission (Tx) power of the PSSCH to transmission (Tx) power of the PSCCH.

The selecting at least one of the candidate resource groups may include determining, by the first user equipment (UE), a time gap between a candidate resource group needed to transmit the control information and a candidate resource group needed to transmit the data information based on either priority information of the aperiodic signal or reliability information of the aperiodic signal.

The selecting of at least one of the candidate resource groups may be performed based on either latency requirement for the aperiodic signal or a remaining time compared to the latency requirement.

In accordance with another aspect of the present disclosure, a first user equipment (UE) configured to transmit a signal in a wireless communication system may include a transceiver and a processor. The processor may select at least one candidate resource group from among a plurality of candidate resource groups each including at least one subchannel needed to transmit an aperiodic signal, and may transmit the aperiodic signal to a second user equipment (UE) using the selected at least one candidate resource group. The at least one candidate resource group may be selected based on a sensing result of the first user equipment (UE) associated with the plurality of candidate resource groups.

As is apparent from the above description, the embodiments of the present disclosure can reduce the number of bits indicating resources to be actually used in a specific resource group. A maximum resource range is first established, and slots and symbols that are actually used in the established resource range can be indicated. When resources are available in all slots within a resource pool, the number of bits needed to indicate resource allocation information may increase.

In accordance with one embodiment of the present disclosure, it is assumed that a specific resource group will always be used for other UEs, and the other UEs can perform sensing on such assumption. The UE may average the sensing results in a resource group, or may select a resource group based on a measurement value (e.g., maximum/minimum/intermediate values in the resource group) measured in a specific sub-channel.

In accordance with one embodiment of the present disclosure, after the Tx UE selects a specific resource group, it is assumed that the selected resource group will not be used by other UEs, such that the Tx UE can freely select resources in the selected resource group. At this time, in order to determine whether other UEs use the same resource group (or in order to receive Tx signals from other sub-channels), some slots or some symbols within the slot may not perform transmission of data. The Tx UE may signal a control signal to peripheral UEs such that the peripheral UEs having received the control signal can recognize which slot is not used for data transmission or which symbol is not used for data transmission.

In accordance with one embodiment of the present disclosure, when transmission (Tx) resources are selected in specific consecutive resource groups, a gain in channel estimation can be obtained. Since consecutive resources are used, a gain in channel estimation/interpolation between slots (i.e., interslot) can be obtained.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

DETAILED DESCRIPTION

Figure 1:
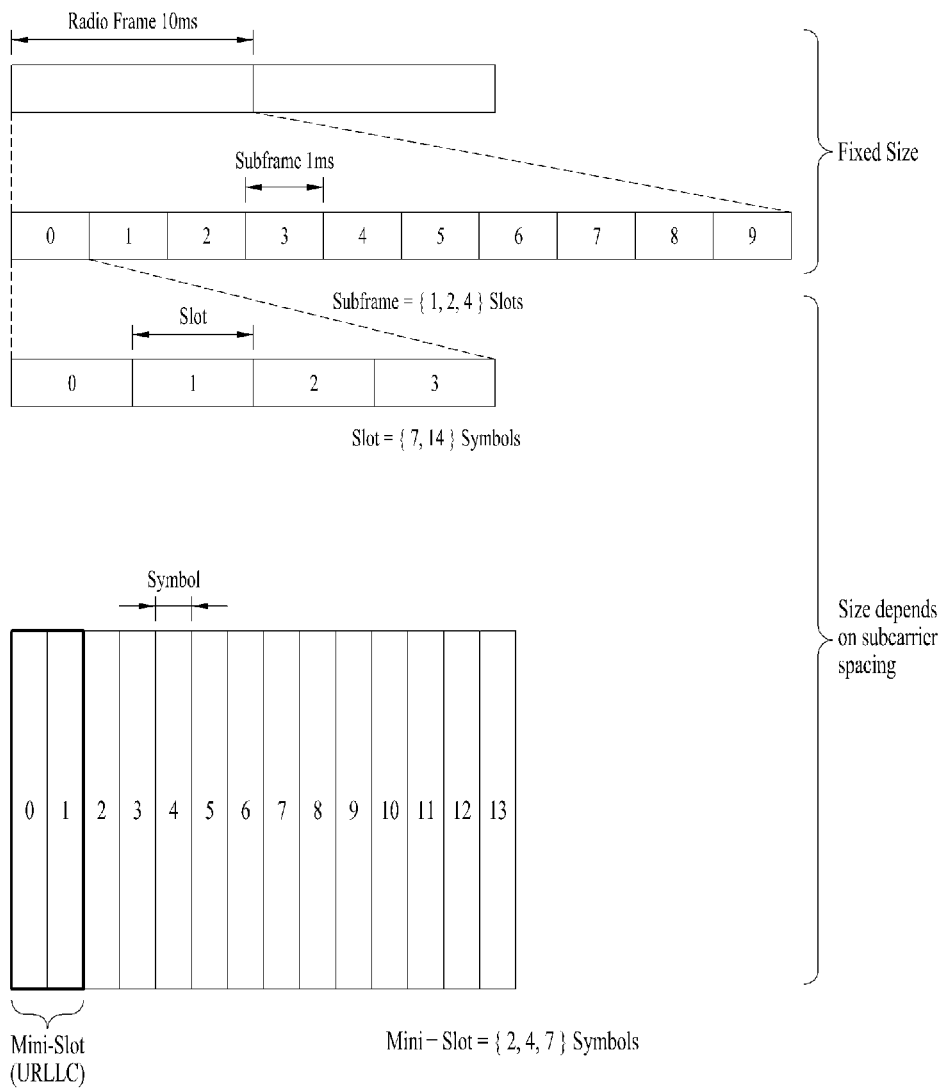
FIG. 1 illustrates a frame structure in new radio (NR)

Hereinafter, downlink (DL) refers to communication from a base station (BS) to a user equipment (UE), and uplink (UL) refers to communication from the UE to the BS. On DL, a transmitter may be a part of the BS and a receiver may be a part of the UE. On UL, the transmitter may be a part of the UE and the receiver may be a part of the BS. In the present disclosure, the BS may be represented as a first communication device and the UE may be represented as a second communication device. The BS may be replaced with the term "fixed station", "Node B", "evolved-Node B (eNB)", "next generation Node B (gNB)", "base transceiver system (BTS)", "access point (AP)", "network or 5G network node", "AI system", "roadside unit (RSU)", or "robot". The UE may be replaced with the term "terminal", "mobile station (MS)", "user terminal (UT)", "mobile subscriber station (MSS), "subscriber station (SS)", "advanced mobile station (AMS)", "wireless terminal (WT)", "machine-type communication (MTC) device", "machine-to-machine (M2M) device", "device-to-device (D2D) device", "vehicle", "robot", or "AI module".

Technology described below may be used in various radio access systems such as a code division multiple access (CDMA) system, a frequency division multiple access (FDMA) system, a time division multiple access (TDMA) system, an orthogonal frequency division multiple access (OFDMA) system, and a single-carrier frequency division multiple access (SC-FDMA) system. CDMA may be implemented by radio technology such as universal terrestrial radio access (UTRA) or CDMA2000. TDMA may be implemented by radio technology such as global system for mobile communications (GSM), general packet radio service (GPRS), or enhanced data rates for GSM evolution (EDGE). OFDMA may be implemented by radio technology such as institute of electrical and electronics engineers (IEEE) 802.11 (Wi-Fi), IEEE 802.16 (WiMAX), IEEE 802.20, or evolved-UTRA (E-UTRA). UTRA is part of universal mobile telecommunications system (UMTS). 3rd generation partnership project (3GPP) long-term evolution (LTE) is part of evolved UMTS (E-UMTS) using E-UTRA and LTE-advanced (LTE-A)/LTE-A pro is an evolved version of 3GPP LTE. 3GPP new radio or new radio access technology (3GPP NR) is an evolved version of 3GPP LTE/LTE-A pro.

For clarity, a description is given based on a 3GPP communication system (e.g., LTE-A or NR) but the scope of the present disclosure is not limited thereto. LTE refers to technology beyond 3GPP TS 36.xxx Release 8. More specifically, LTE technology beyond 3GPP TS 36.xxx Release 10 is referred to as LTE-A, and LTE technology beyond 3GPP TS 36.xxx Release 13 is referred to as LTE-A pro. 3GPP NR refers to technology beyond TS 38.xxx Release 15. LTE/NR may be referred to as a 3GPP system. "xxx" represents a detailed number of a technical specification. LTE/NR may be collectively referred to as a 3GPP system.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, or repeater may be the node. Furthermore, the node may not be the BS. For example, a radio remote head (RRH) or a radio remote unit (RRU) may be the node. Generally, the RRH or RRU has a power level lower than that of the BS. At least one antenna is installed per node. The antenna may refer to a physical antenna or refer to an antenna port, a virtual antenna, or an antenna group. The node may also be called a point.

In the present disclosure, a cell refers to a specific geographical area or a radio resource in or on which one or more nodes provide communication services. The "cell" of the geographic area may be understood as coverage within which a node may provide services using a carrier, and the "cell" of the radio resources is associated with bandwidth, which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of a radio resource used by the node. Accordingly, the term "cell" may be used to indicate service coverage by the node sometimes, the radio resource at other times, or a range within which a signal using the radio resource may reach with valid strength at other times.

In the present disclosure, communicating with a specific cell may mean communicating with a BS or a node that provides communication services to the specific cell. A DL/UL signal of the specific cell refers to a DL/UL signal from/to the BS or the node that provides communication services to the specific cell. A cell that provides UL/DL communication services to a UE is especially called a serving cell. Furthermore, channel status/quality of the specific cell refers to status/quality of a channel or a communication link formed between the BS or the node that provides communication services to the specific cell and the UE.

The "cell" associated with the radio resource may be defined by a combination of DL resources and UL resources, i.e., a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information transmitted through a corresponding cell. In this case, the carrier frequency may be equal to or different from a center frequency of each cell or CC. Hereinbelow, a cell operating on a primary frequency will be referred to as a primary cell (Pcell) or a primary CC (PCC), and a cell operating on a secondary frequency will be referred to as a secondary cell (Scell) or a secondary CC (SCC). The Scell may be configured after a UE and a BS perform a radio resource control (RRC) connection establishment procedure and thus RRC connection is established between the UE and the BS, i.e., after the UE is in an RRC-CONNECTED state. RRC connection may mean a path through which RRC of the UE may exchange messages with RRC of the BS. The Scell may be configured to provide additional radio resources to the UE. The Scell and the Pcell may form a set of serving cells for the UE according to capabilities of the UE. Only one serving cell configured with the Pcell exists for an RRC CONNECTED UE which is not configured with carrier aggregation or does not support carrier aggregation.

A cell supports a unique RAT. For example, LTE RAT-based transmission/reception is performed in an LTE cell, and 5G RAT-based transmission/reception is performed in a 5G cell.

Carrier aggregation (CA) aggregates a plurality of carriers each having a narrower system bandwidth than a target bandwidth to support broadband. CA differs from OFDMA in that DL or UL communication is performed using a plurality of carrier frequencies each forming a system bandwidth (or channel bandwidth) in the former, and DL or UL communication is performed by carrying a basic frequency band divided into a plurality of orthogonal subcarriers in one carrier frequency in the latter. In OFDMA or orthogonal frequency division multiplexing (OFDM), for example, one frequency band having a certain system bandwidth is divided into a plurality of subcarriers with a predetermined subcarrier spacing, information/data is mapped to the plurality of subcarriers, and the frequency band in which the information/data has been mapped is transmitted in a carrier frequency of the frequency band through frequency upconversion. In wireless CA, frequency bands each having a system bandwidth and a carrier frequency may be used simultaneously used for communication, and each frequency band used in CA may be divided into a plurality of subcarriers with a predetermined subcarrier spacing.

The 3GPP-based communication standards define DL physical channels corresponding to resource elements (REs) carrying information originated from upper layers of a physical layer (e.g., a medium access control (MAC) layer, a radio link control (RLC) layer, a packet data convergence protocol (PDCP) layer, an RRC layer, a service data adaptation protocol (SDAP) layer, and a non-access stratum (NAS) layer), and DL physical signals corresponding to REs which are used in the physical layer but do not deliver information originated from the upper layers. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal (RS) and a synchronization signal are defined as the DL physical signals. The RS, also called a pilot, means a signal of a predefined special waveform known to both a BS and a UE. For example, a cell-specific RS (CRS), a UEspecific RS (UE-RS), a positioning RS (PRS), a channel state information RS (CSI-RS), and a demodulation RS (DMRS) are defined as DL RSs. The 3GPP-based communication standards also define UL physical channels corresponding to REs carrying information originating from upper layers, and UL physical signals corresponding to REs which are used in the physical layer but do not carry information originating from the upper layers. For example, a physical uplink shared channel (PUSCH), a physical uplink control channel (PUCCH), and a physical random access channel (PRACH) are defined as the UL physical channels, and a DMRS for a UL control/data signal and a sounding reference signal (SRS) used for UL channel measurement are defined for the UL physical signals.

In the present disclosure, the PDCCH and the PDSCH may refer to a set of time-frequency resources or REs that carry downlink control information (DCI) and DL data, respectively. The PUCCH, PUSCH, and PRACH refer to a set of time-frequency resources or REs that carry uplink control information (UCI), UL data, and random access signals, respectively. In the following description, "the UE transmits a UL physical channel (e.g., a PUCCH, PUSCH, or PRACH)" may mean that the UE transmits the UCI, UL data, or random access signals on or through the UL physical channel, and "the BS receives a UL physical channel" may mean that the BS receives the UCI, UL data, or random access signal on or through the UL physical channel. "The BS transmits a DL physical channel (e.g., a PDCCH or PDSCH)" may mean that the BS transmits the DCI or DL data on or through the DL physical channel, and "the UE receives a DL physical channel" may mean that the UE receives the DCI or DL data on or through the DL physical channel.

In the present disclosure, a transport block (TB) is payload for a physical layer. For example, data provided to the physical layer by an upper layer or a MAC layer is basically referred to as a TB.

In the present disclosure, hybrid automatic repeat and request (HARQ) is a kind of error control technique. HARQ acknowledgement (HARQ-ACK) transmitted on DL is used for error control of UL data, and HARQ-ACK transmitted on UL is used for error control of DL data. A transmitter performing a HARQ operation awaits reception of ACK after transmitting data (e.g., a TB or a codeword). A receiver performing a HARQ operation transmits ACK only when data has been successfully received and transmits negative ACK (NACK) when the received data has an error. Upon receipt of ACK, the transmitter may transmit (new) data, and upon receipt of NACK, the transmitter may retransmit the data. Time delay occurs until a BS receives ACK/NACK from a UE and transmits retransmission data after transmitting scheduling information and data according to the scheduling information. The time delay is generated due to channel propagation delay or time consumed for data decoding/encoding. Accordingly, if new data is transmitted after a HARQ process which is currently in progress is ended, a gap in data transmission occurs due to time delay. In order to prevent the gap in data transmission from occurring during a time delay duration, a plurality of independent HARQ processes is used. For example, when there are 7 transmission occasions between initial transmission and retransmission, a communication device may perform 7 independent HARQ processes to transmit data without any gap. A plurality of parallel HARQ processes enables successive UL/DL transmission while the device awaits HARQ feedback for previous UL/DL transmission.

In the present disclosure, CSI generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

In the present disclosure, frequency division multiplexing (FDM) may mean that signals/channels/users are transmitted/received on different frequency resources, and time division multiplexing (TDM) may mean that signals/channels/users are transmitted/received on different time resources.

In the present disclosure, frequency division duplex (FDD) refers to a communication scheme in which UL communication is performed on a UL carrier and DL communication is performed on a DL carrier linked to the UL carrier, and time division duplex (TDD) refers to a communication scheme in which UL and DL communication are performed by splitting time.

The details of the background, terminology, abbreviations, etc. used herein may be found in documents published before the present disclosure. For example, 3GPP TS 24 series, 3GPP TS 34 series, and 3GPP TS 38 series may be referenced (http://www.3gpp.org/specifications/specification-numbering).

Frame Structure

FIG. 1 is a diagram illustrating a frame structure in NR.

The NR system may support multiple numerologies. The numerology is defined by a subcarrier spacing and cyclic prefix (CP) overhead. A plurality of subcarrier spacings may be derived by scaling a basic subcarrier spacing by an integer N (or μ). The numerology may be selected independently of the frequency band of a cell although it is assumed that a small subcarrier spacing is not used at a high carrier frequency. In addition, the NR system may support various frame structures based on the multiple numerologies.

Hereinafter, an OFDM numerology and a frame structure, which may be considered in the NR system, will be described. Table 1 shows multiple OFDM numerologies supported in the NR system. The value of μ for a bandwidth part and a CP may be obtained by RRC parameters provided by the BS.

TABLE 1

| μ | $\Delta f = 2^\mu * 15$ [kHz] | Cyclic prefix(CP) |
|---|---|---|
| 0 | 15 | Normal |
| 1 | 30 | Normal |
| 2 | 60 | Normal, Extended |
| 3 | 120 | Normal |
| 4 | 240 | Normal |

The NR system supports multiple numerologies (e.g., subcarrier spacings) to support various 5G services. For example, the NR system supports a wide area in conventional cellular bands in a subcarrier spacing of 15 kHz and supports a dense urban environment, low latency, and wide carrier BW in a subcarrier spacing of 30/60 kHz. In a subcarrier spacing of 60 kHz or above, the NR system supports a BW higher than 24.25 GHz to overcome phase noise.

Resource Grid

Figure 2:
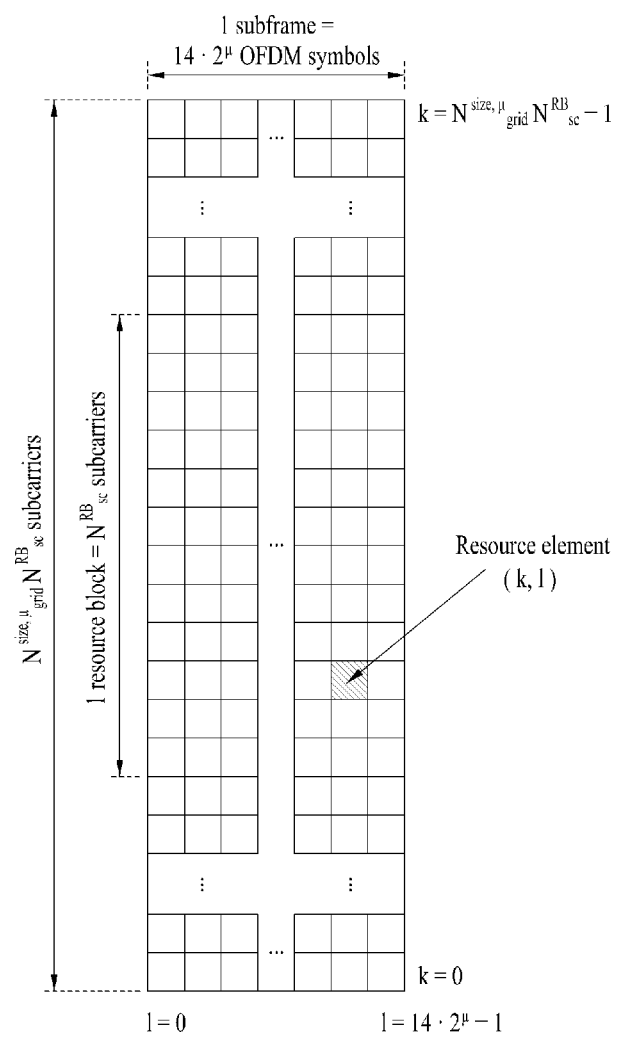
FIG. 2 illustrates a resource grid in NR.

FIG. 2 illustrates a resource grid in the NR.

Referring to FIG. 2, a resource grid consisting of Nsize, μgrid*NRBsc subcarriers and 14*2μ, OFDM symbols may be defined for each subcarrier spacing configuration and carrier, where Nsize,µgrid is indicated by RRC signaling from the BS. Nsize,µgrid may vary not only depending on the subcarrier spacing configuration µ but also between UL and DL. One resource grid exists for the subcarrier spacing configuration µ, an antenna port p, and a transmission direction (i.e., UL or DL). Each element in the resource gird for the subcarrier spacing configuration µ and the antenna port p may be referred to as a resource element and identified uniquely by an index pair of (k, l), where k denotes an index in the frequency domain and l denotes the relative location of a symbol in the frequency domain with respect to a reference point. The resource element (k, l) for the subcarrier spacing configuration µ and the antenna port p may be a physical resource and a complex value, a(p,µ)k,l. A resource block (RB) is defined as NRBsc consecutive subcarriers in the frequency domain (where NRBsc=12).

Considering that the UE is incapable of supporting a wide BW supported in the NR system, the UE may be configured to operate in a part of the frequency BW of a cell (hereinafter referred to as a bandwidth part (BWP)).

Bandwidth Part (BWP)

The NR system may support up to 400 MHz for each carrier. If the UE always keeps a radio frequency (RF) module on for all carriers while operating on such a wideband carrier, the battery consumption of the UE may increase. Considering multiple use cases (e.g., eMBB, URLLC, mMTC, V2X, etc.) operating in one wideband carrier, a different numerology (e.g., subcarrier spacing) may be supported for each frequency band of the carrier. Further, considering that each UE may have a different capability regarding the maximum BW, the BS may instruct the UE to operate only in a partial BW rather than the whole BW of the wideband carrier. The partial bandwidth is referred to as the BWP. The BWP is a subset of contiguous common RBs defined for numerology µi in BWP i of the carrier in the frequency domain, and one numerology (e.g., subcarrier spacing, CP length, and/or slot/mini-slot duration) may be configured for the BWP.

The BS may configure one or more BWPs in one carrier configured for the UE. Alternatively, if UEs are concentrated in a specific BWP, the BS may move some UEs to another BWP for load balancing. For frequency-domain inter-cell interference cancellation between neighbor cells, the BS may configure BWPs on both sides of a cell except for some central spectra in the whole BW in the same slot. That is, the BS may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), instruct the UE to switch to another configured DL/UL BWP (by L1 signaling, a MAC CE, or RRC signaling), or set a timer value and switch the UE to a predetermined DL/UL BWP upon expiration of the timer value. In particular, an activated DL/UL BWP is referred to as an active DL/UL BWP. While performing initial access or before setting up an RRC connection, the UE may not receive a DL/UL BWP configuration. A DL/UL BWP that the UE assumes in this situation is referred to as an initial active DL/UL BWP.

Synchronization Acquisition of Sidelink UE

In time division multiple access (TDMA) and frequency division multiple access (FDMA) systems, accurate time and frequency synchronization is essential. If time and frequency synchronization is not accurate, inter-symbol interference (ISI) and inter-carrier interference (ICI) may occur so that system performance may be degraded. This may occur in V2X. For time/frequency synchronization in V2X, a sidelink synchronization signal (SLSS) may be used in the physical layer, and master information block-sidelink-V2X (MIB-SL-V2X) may be used in the RLC layer.

Figure 3:
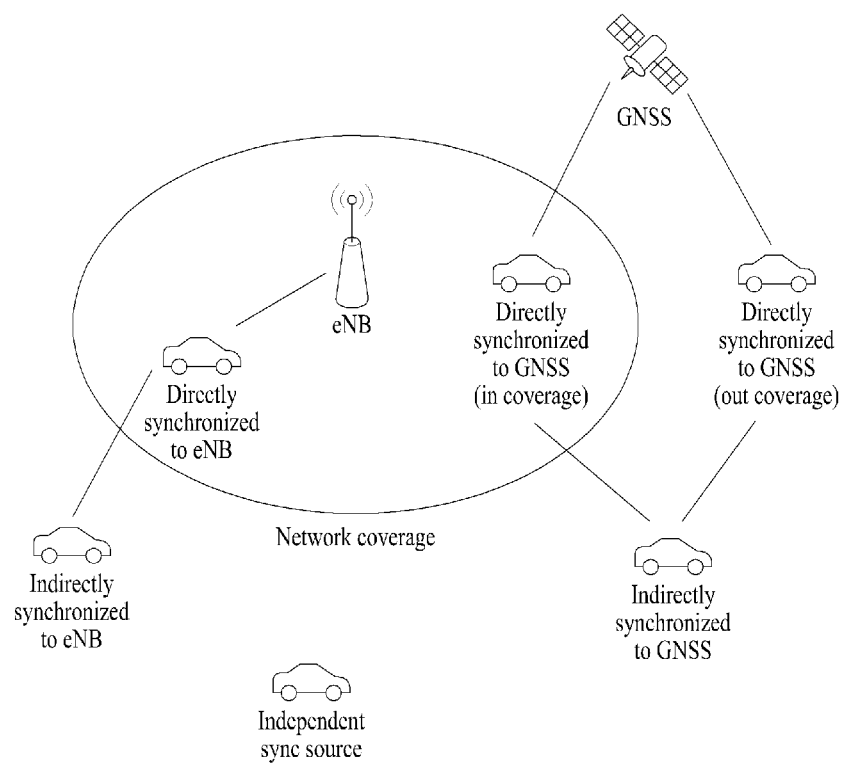
FIG. 3 illustrates sidelink synchronization.

FIG. 3 illustrates a synchronization source and a synchronization reference in V2X.

Referring to FIG. 3, in V2X, a UE may be directly synchronized to global navigation satellite systems (GNSS) or indirectly synchronized to the GNSS through another UE (in or out of the network coverage) that is directly synchronized to the GNSS. When the GNSS is set to the synchronization source, the UE may calculate a direct frame number (DFN) and a subframe number based on coordinated universal time (UTC) and a (pre)configured DFN offset.

Alternatively, the UE may be directly synchronized to the BS or synchronized to another UE that is time/frequency synchronized to the BS. For example, if the UE is in the coverage of the network, the UE may receive synchronization information provided by the BS and be directly synchronized to the BS. Thereafter, the UE may provide the synchronization information to another adjacent UE. If the timing of the BS is set to the synchronization reference, the UE may follow a cell associated with a corresponding frequency (if the UE is in the cell coverage at the corresponding frequency) or follow a PCell or serving cell (if the UE is out of the cell coverage at the corresponding frequency) for synchronization and DL measurement.

The serving cell (BS) may provide a synchronization configuration for carriers used in V2X sidelink communication. In this case, the UE may follow the synchronization configuration received from the BS. If the UE detects no cell from the carriers used in the V2X sidelink communication and receives no synchronization configuration from the serving cell, the UE may follow a predetermined synchronization configuration.

Alternatively, the UE may be synchronized to another UE that fails to directly or indirectly obtain the synchronization information from the BS or GNSS. The synchronization source and preference may be preconfigured for the UE or configured in a control message from the BS.

Hereinbelow, the SLSS and synchronization information will be described.

The SLSS may be a sidelink-specific sequence and include a primary sidelink synchronization signal (PSSS) and a secondary sidelink synchronization signal (SSSS).

Each SLSS may have a physical layer sidelink synchronization identity (ID), and the value may be, for example, any of 0 to 335. The synchronization source may be identified depending on which of the above values is used. For example, 0, 168, and 169 may indicate the GNSS, 1 to 167 may indicate the BS, and 170 to 335 may indicate out-of-coverage. Alternatively, among the values of the physical layer sidelink synchronization ID, 0 to 167 may be used by the network, and 168 to 335 may be used for the out-of-coverage state.

Figure 4:
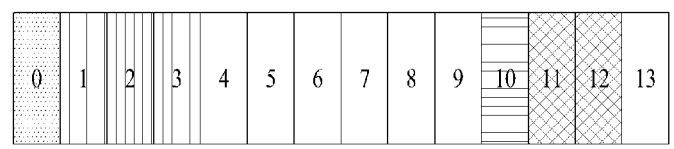
FIG. 4 illustrates a time resource unit for transmitting a sidelink synchronization signal.
Figure 4:
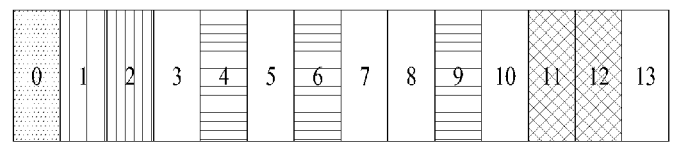
Figure 4:
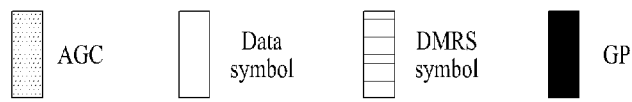
Figure 4:
Figure 5:
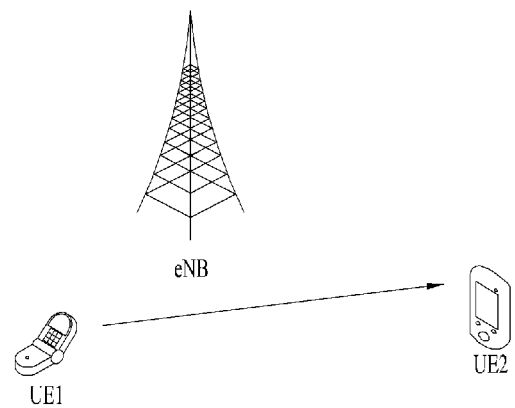
FIG. 5 is a view illustrating an exemplary resource pool for sidelink.
Figure 5:
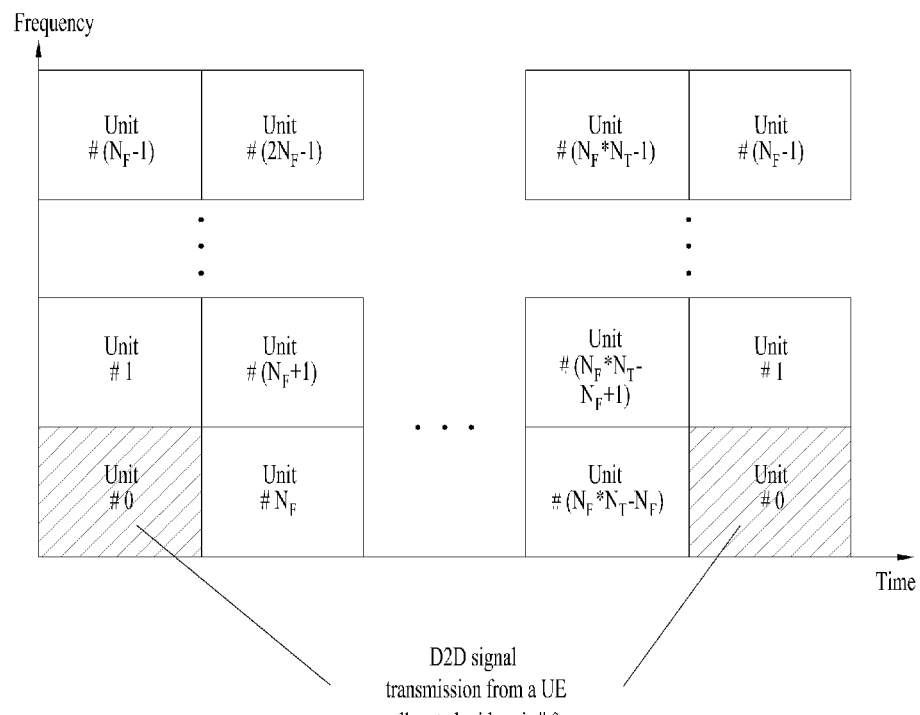
Figure 6:
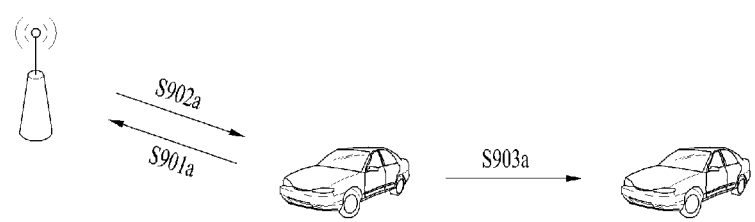
FIG. 6 is a view referred to for describing transmission modes and scheduling schemes for sidelink.
Figure 6:
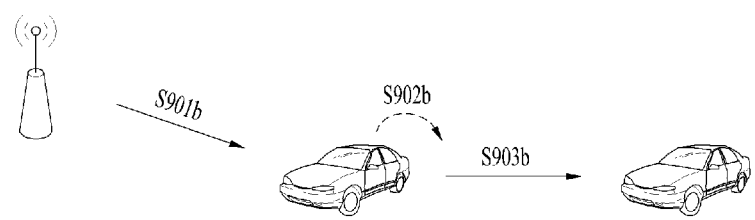

FIG. 4 illustrates a time resource unit for SLSS transmission. The time resource unit may be a subframe in LTE/LTE-A and a slot in 5G. The details may be found in 3GPP TS 36 series or 3GPP TS 28 series. A physical sidelink broadcast channel (PSBCH) may refer to a channel for carrying (broadcasting) basic (system) information that the UE needs to know before sidelink signal transmission and reception (e.g., SLSS-related information, a duplex mode (DM), a TDD UL/DL configuration, information about a resource pool, the type of an SLSS-related application, a subframe offset, broadcast information, etc.). The PSBCH and SLSS may be transmitted in the same time resource unit, or the PSBCH may be transmitted in a time resource unit after that in which the SLSS is transmitted. A DMRS may be used to demodulate the PSBCH.

Sidelink Transmission Mode

For sidelink communication, transmission modes 1, 2, 3 and 4 are used.

In transmission mode 1/3, the BS performs resource scheduling for UE 1 over a PDCCH (more specifically, DCI) and UE 1 performs D2D/V2X communication with UE 2 according to the corresponding resource scheduling. After transmitting sidelink control information (SCI) to UE 2 over a physical sidelink control channel (PSCCH), UE 1 may transmit data based on the SCI over a physical sidelink shared channel (PSSCH). Transmission modes 1 and 3 may be applied to D2D and V2X, respectively.

Transmission mode 2/4 may be a mode in which the UE performs autonomous scheduling (self-scheduling). Specifically, transmission mode 2 is applied to D2D. The UE may perform D2D operation by autonomously selecting a resource from a configured resource pool. Transmission mode 4 is applied to V2X. The UE may perform V2X operation by autonomously selecting a resource from a selection window through a sensing process. After transmitting the SCI to UE 2 over the PSCCH, UE 1 may transmit data based on the SCI over the PSSCH. Hereinafter, the term 'transmission mode' may be simply referred to as 'mode'.

Control information transmitted by a BS to a UE over a PDCCH may be referred to as DCI, whereas control information transmitted by a UE to another UE over a PSCCH may be referred to as SCI. The SCI may carry sidelink scheduling information. The SCI may have several formats, for example, SCI format 0 and SCI format 1.

SCI format 0 may be used for scheduling the PSSCH. SCI format 0 may include a frequency hopping flag (1 bit), a resource block allocation and hopping resource allocation field (the number of bits may vary depending on the number of sidelink RBs), a time resource pattern (7 bits), a modulation and coding scheme (MCS) (5 bits), a time advance indication (11 bits), a group destination ID (8 bits), etc.

SCI format 1 may be used for scheduling the PSSCH. SCI format 1 may include a priority (3 bits), a resource reservation (4 bits), the location of frequency resources for initial transmission and retransmission (the number of bits may vary depending on the number of sidelink subchannels), a time gap between initial transmission and retransmission (4 bits), an MCS (5 bits), a retransmission index (1 bit), a reserved information bit, etc. Hereinbelow, the term 'reserved information bit' may be simply referred to as 'reserved bit'. The reserved bit may be added until the bit size of SCI format 1 becomes 32 bits.

SCI format 0 may be used for transmission modes 1 and 2, and SCI format 1 may be used for transmission modes 3 and 4.

Sidelink Resource Pool

Figure 8:
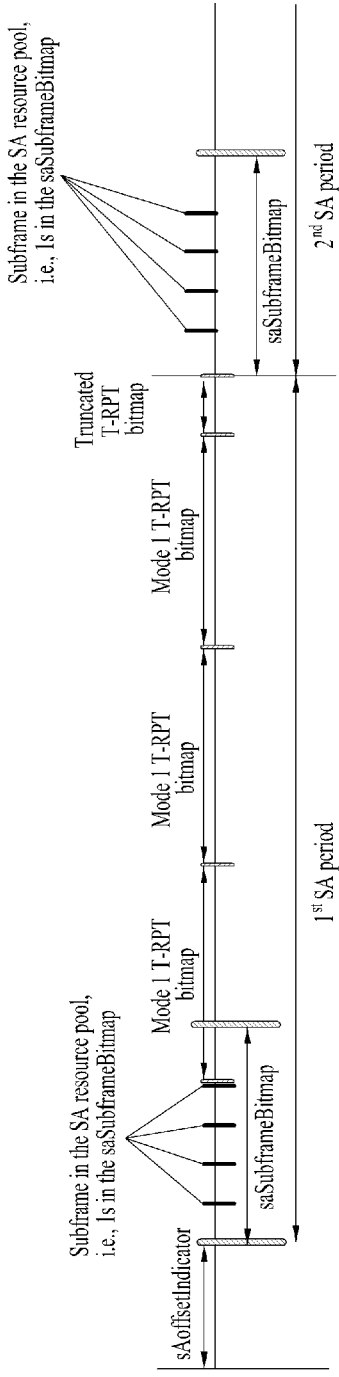
FIG. 8 illustrates transmission of a physical sidelink control channel (PSCCH).

FIG. 8 shows an example of a first UE (UE1), a second UE (UE2) and a resource pool used by UE1 and UE2 performing sidelink communication.

In FIG. 8(a), a UE corresponds to a terminal or such a network device as an eNB transmitting and receiving a signal according to a sidelink communication scheme. A UE selects a resource unit corresponding to a specific resource from a resource pool corresponding to a set of resources and the UE transmits a sidelink signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for sidelink signal transmission. FIG. 8(b) shows an example of configuring a resource unit. Referring to FIG. 8(b), the entire frequency resources are divided into the NF number of resource units and the entire time resources are divided into the NT number of resource units. In particular, it is able to define NF*NT number of resource units in total. In particular, a resource pool can be repeated with a period of NT subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a sidelink signal.

A resource pool can be classified into various types. First of all, the resource pool can be classified according to contents of a sidelink signal transmitted via each resource pool. For example, the contents of the sidelink signal can be classified into various signals and a separate resource pool can be configured according to each of the contents. The contents of the sidelink signal may include a scheduling assignment (SA or physical sidelink control channel (PSCCH)), a sidelink data channel, and a discovery channel. The SA may correspond to a signal including information on a resource position of a sidelink data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with sidelink data. In this case, an SA resource pool may correspond to a pool of resources that an SA and sidelink data are transmitted in a manner of being multiplexed. The SA signal can also be referred to as a sidelink control channel or a physical sidelink control channel (PSCCH). The sidelink data channel (or, physical sidelink shared channel (PSSCH)) corresponds to a resource pool used by a transmitting UE to transmit user data. If an SA and a sidelink data are transmitted in a manner of being multiplexed in an identical resource unit, sidelink data channel except SA information can be transmitted only in a resource pool for the sidelink data channel. In other word, REs, which are used to transmit SA information in a specific resource unit of an SA resource pool, can also be used for transmitting sidelink data in a sidelink data channel resource pool. The discovery channel may correspond to a resource pool for a message that enables a neighboring UE to discover transmitting UE transmitting information such as ID of the UE, and the like.

Despite the same contents, sidelink signals may use different resource pools according to the transmission and reception properties of the sidelink signals. For example, despite the same sidelink data channels or the same discovery messages, they may be distinguished by different resource pools according to transmission timing determination schemes for the sidelink signals (e.g., whether a sidelink signal is transmitted at the reception time of a synchronization reference signal or at a time resulting from applying a predetermined TA to the reception time of the synchronization reference signal), resource allocation schemes for the sidelink signals (e.g., whether an eNB configures the transmission resources of an individual signal for an individual transmitting UE or the individual transmitting UE autonomously selects the transmission resources of an individual signal in a pool), the signal formats of the sidelink signals (e.g., the number of symbols occupied by each sidelink signal in one subframe or the number of subframes used for transmission of a sidelink signal), signal strengths from the eNB, the transmission power of a sidelink UE, and so on. In sidelink communication, a mode in which an eNB directly indicates transmission resources to a sidelink transmitting UE is referred to as sidelink transmission mode 1, and a mode in which a transmission resource area is preconfigured or the eNB configures a transmission resource area and the UE directly selects transmission resources is referred to as sidelink transmission mode 2. In sidelink discovery, a mode in which an eNB directly indicates resources is referred to as Type 2, and a mode in which a UE selects transmission resources directly from a preconfigured resource area or a resource area indicated by the eNB is referred to as Type 1.

In V2X, sidelink transmission mode 3 based on centralized scheduling and sidelink transmission mode 4 based on distributed scheduling are available.

Figure 9:
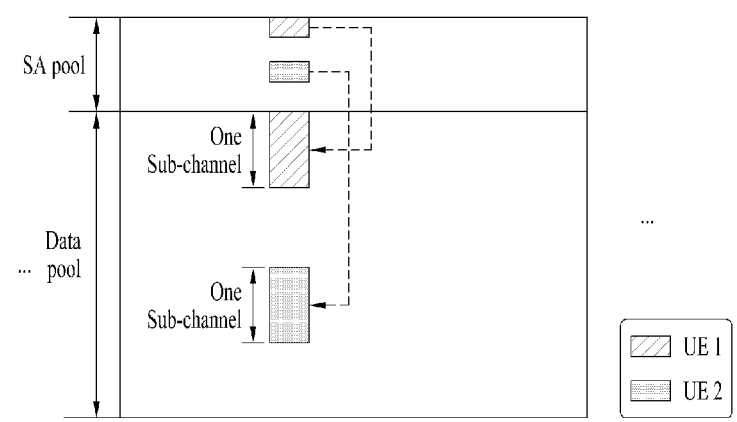
FIG. 9 illustrates PSCCH transmission in sidelink vehicle-to-everything (V2X) communication.
Figure 9:
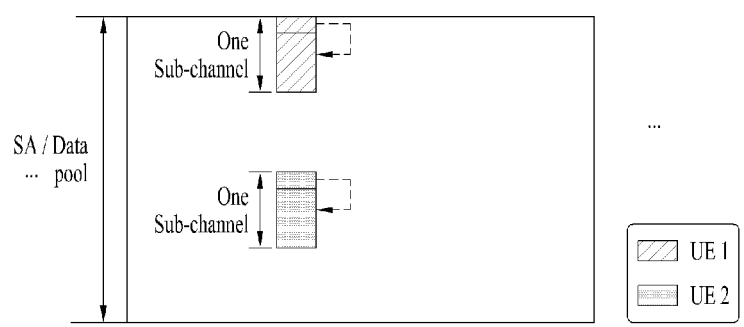

FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b).

Figure 7:
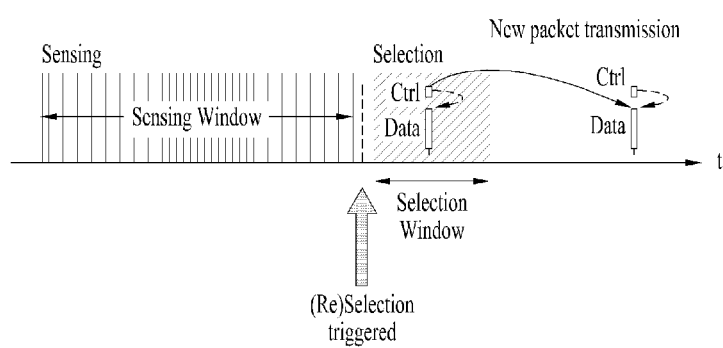
FIG. 7 is a view illustrating a method of selecting resources in sidelink.

In this case, when the transmission resources are selected, transmission resources for a next packet are also reserved as illustrated in FIG. 7. In V2X, transmission is performed twice for each MAC PDU. When resources for initial transmission are selected, resources for retransmission are also reserved with a predetermined time gap from the resources for the initial transmission. The UE may identify transmission resources reserved or used by other UEs through sensing in a sensing window, exclude the transmission resources from a selection window, and randomly select resources with less interference from among the remaining resources.

For example, the UE may decode a PSCCH including information about the cycle of reserved resources within the sensing window and measure PSSCH RSRP on periodic resources determined based on the PSCCH. The UE may exclude resources with PSCCH RSRP more than a threshold from the selection window. Thereafter, the UE may randomly select sidelink resources from the remaining resources in the selection window.

Alternatively, the UE may measure received signal strength indication (RSSI) for the periodic resources in the sensing window and identify resources with less interference, for example, the bottom 20 percent. After selecting resources included in the selection window from among the periodic resources, the UE may randomly select sidelink resources from among the resources included in the selection window. For example, when PSCCH decoding fails, the above method may be applied.

The details thereof may be found in clause 14 of 3GPP TS 3GPP TS 36.213 V14.6.0, which are incorporated herein by reference.

Transmission and Reception of PSCCH

A UE in sidelink transmission mode 1 may transmit a PSCCH (a sidelink signal or sidelink control information (SCI)) in resources configured by an eNB. A UE in sidelink transmission mode 2 may be configured with resources for sidelink transmission by the eNB, select time and frequency resources from among the configured resources, and transmit a PSCCH in the selected time and frequency resources.

In sidelink transmission mode 1 or 2, a PSCCH period may be defined as illustrated in FIG. 8.

Referring to FIG. 8, a first PSCCH (or a scheduling assignment, SA) period may start in a subframe spaced from a specific system frame by a specific offset indicated by higher-layer signaling. Each PSCCH period may include a PSCCH resource pool and a subframe pool for sidelink data transmission. The PSCCH resource pool may include the first subframe of the PSCCH period to the last of subframes indicated as carrying a PSCCH by a subframe bitmap, saSubframeBitmap. The resource pool for sidelink data transmission may include subframes determined by a time-resource pattern for transmission (T-RPT) (or a time-resource pattern (TRP)) in mode 1. As illustrated, when the number of subframes included in the PSCCH period except for the PSCCH resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Unlike sidelink, an SA (PSCCH) and data (PSSCH) are transmitted in FDM in V2X, that is, sidelink transmission mode 3 or 4. Because latency reduction is a significant factor in V2X in view of the nature of vehicle communication, a PSCCH and data are transmitted in FDM in different frequency resources of the same time resources. Examples of this transmission scheme are illustrated in FIG. 9. A PSCCH and data may not be contiguous to each other as illustrated in FIG. 9(a) or may be contiguous to each other as illustrated in FIG. 9(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

Sidelink Congestion Control

A sidelink radio communication environment may easily become congested according to increases in the density of vehicles, the amount of information transfer, etc. Various methods are applicable for congestion reduction. For example, distributed congestion control may be applied.

In the distributed congestion control, a UE understands the congestion level of a network and performs transmission control. In this case, the congestion control needs to be performed in consideration of the priorities of traffic (e.g., packets).

Specifically, each UE may measure a channel busy ratio (CBR) and then determine the maximum value (CRlimitk) of a channel occupancy ratio (CRk) that can be occupied by each traffic priority (e.g., k) according to the CBR. For example, the UE may calculate the maximum value (CRlimitk) of the channel occupancy ratio for each traffic priority based on CBR measurement values and a predetermined table. If traffic has a higher priority, the maximum value of the channel occupancy ratio may increase.

The UE may perform the congestion control as follows. The UE may limit the sum of the channel occupancy ratios of traffic with a priority k such that the sum does not exceed a predetermined value, where k is less than i. According to this method, the channel occupancy ratios of traffic with low priorities are further restricted.

Besides, the UE may use methods such as control of the magnitude of transmission power, packet drop, determination of retransmission or non-retransmission, and control of the size of a transmission RB (MCS adjustment).

5G Use Cases

Three key requirement areas of 5G (e.g., NR) include (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity; provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple 5G use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

The present disclosure proposes a resource selection method when aperiodic traffic occurs in UE-to-UE direct communication. Although the following method proposed by the present disclosure will hereinafter be described centering upon UE-to-UE direct communication for convenience of description, the proposed method can also be used not only in general Device-to-Device (D2D) communication, but also in Internet of Things (IoT) UE, a V2X UE, or a fixed node such as a relay or a BS (e.g., eNB or gNB). Unless otherwise mentioned, the following proposed method can also be applied to other types of wireless terminals and other scenarios without difficulty.

In addition, the term "aperiodic packet" may refer to i) a packet that is not generated within a specific time section after transmission of a previous packet, ii) a packet including an indicator indicating that the packet is aperiodically generated through higher layer signaling or is generated in an event triggered manner, iii) a packet requesting either a specific PPPP (or higher) or a specific PPPP (or less), or iv) a packet requesting a specific PPPR (or higher) or a specific PPPR (or less). For example, the UE may average a period generated when the packet is generated, such that the UE can predict a time at which the next packet will be generated. In this case, if a packet is generated in a range outside the predicted time, it is impossible for the packet to use reserved resources in PHY/MAC layers. In this case, for stable transmission, the aforementioned control signal is first transmitted at a time earlier by a predetermined time, so that the operation for requesting preemption from another UE may be carried out. Alternatively, the range within which transmission is expected is designated so that the other UE can stably avoid transmission.

The embodiments of the present disclosure propose a method for selecting resources when aperiodic traffic occurs in UE-to-UE direct communication. That is, the embodiments of the present disclosure provide aperiodic traffic handling methods for V2X communication.

In 3GPP Rel.14 V2X, the sensing operation with semi-persistent transmission may be mainly appropriate for the case in which the packet is periodically generated. The sensing operation is performed and transmission (Tx) resources are maintained at intervals of a predetermined time, such that the other UE can more stably perform such sensing. Specifically, since the sensing results for several transmissions can be accumulated, the sensing coverage is enlarged to mitigate a hidden node problem. In this case, the hidden node problem may refer to a phenomenon in which, when three nodes are present in a wireless LAN, whereas communication of one intermediate node from among the three nodes is possible because the intermediate node can view both nodes from among the three nodes, communication between obstacles or between two nodes distant from each other is impossible.

However, a wireless communication system in which the packet is variable in size or the period of the packet is changeable may request too many resource reselection actions, so that the above-mentioned scheme may be considered inappropriate. For example, overload and/or a processing delay of the wireless communication system may occur.

If a predetermined maintenance period in which resource selection can be maintained exists to reduce (or prevent) the hidden node problem encountered in aperiodic traffic, the maintenance period may be beneficial to the sensing operation.

The aperiodic traffic may not correctly recognize a scheduled generation time of the next packet, so that the operation for reserving relatively distant resources in the time domain using the next packet may be undesirable (because there is a possibility that aperiodic traffic exists in relatively distant resources in the time domain). Accordingly, when using aperiodic traffic, in a situation in which a packet is generated, a reservation method indicating that consecutive resources in a predetermined time section will be used only for the currently generated packet can be used.

For the above-mentioned operation, transmission of a packet aperiodically generated may be continuously maintained for a predetermined time, or the operation of informing whether data will be transmitted in advance is needed for the aperiodic packet. This is because, when transmission of the packet is performed only for a short time and the packet then disappears, even though a peripheral UE recognizes such situation, it is impossible for the peripheral UE to avoid collision between resources.

In the present disclosure, when the packet is generated, it is assumed that the UE performs sensing on a subchannel basis and selects resources on a subchannel basis.

For example, the number of subchannels may depend on the FFT size and time-frequency mapping. The subchannel may include a plurality of subcarriers. The number of subcarriers for each subchannel is dependent on a permutation scheme. The permutation may refer to an operation for mapping logical subchannels to physical subcarriers. For example, in FUSC (Full Usage of Subchannels), the subchannel may include 48 subcarriers. In PUSC (Partial Usage of Subchannels), the subchannel may include 24 or 16 subcarriers. In the present disclosure, the set (or aggregate) of one or more subchannels may be referred to as a candidate resource group or a segment.

When the packet is generated and (re)selection of Tx resources is triggered, the UE may select Tx resources using the sensing result obtained prior to a predetermined time. For example, a candidate resource group in which (re)selection of Tx resources is triggered in a previous slot may not be selected by the UE. In other words, the UE may select at least one of the remaining candidate resource groups other than the candidate resource group in which (re)selection of Tx resources is triggered in the previous slot, and may use the selected resource group for signal transmission/reception.

In the present disclosure, the sensing operation can be defined as follows. For example, the sensing operation may be based on 2-step approach of 3GPP Rel.14 V2X. During the sensing operation, a physical sidelink control channel (PSCCH) can be decoded, and an RSRP (Reference Signals Received Power) of the PSSCH indicated by the PSCCH can be measured. If the measured RSRP is higher than a predetermined threshold, the RSRP higher than the threshold may assume that the corresponding subchannel is being used. In a subsequent step, a Sidelink-Received Signal Strength Indicator (S-RSSI) per subchannel may be measured, such that resources in which S-RSSI is less than a predetermined threshold may be available candidate resources. In another example, the sensing operation may refer to a specific operation in which transmission (Tx) resources reserved by another UE or resources being used by another UE can be recognized (or detected or confirmed) through sensing within a sensing window.

In the present disclosure, if a specific subchannel satisfies at least one condition from among the following conditions for convenience of description, i) the specific subchannel may be regarded as a subchannel that is currently used by another UE, and ii) the specific subchannel may be regarded as a subchannel that cannot be used as a candidate resource for data transmission.

In accordance with one embodiment of the present disclosure, 1) when PSCCH (Physical Sidelink Shared Channel) for scheduling a specific subchannel is decoded, 2) when the PSCCH scheduling the specific subchannel is decoded and reception (Rx) power (e.g., PSCCH RSRP) is equal to or higher than a predetermined threshold, 3) when an RSRP (e.g., PSSCH RSRP) of the specific subchannel is equal to or higher than a predetermined threshold, or 4) when an RSSI (e.g., S-RSSI) of a specific subchannel is equal to or higher than a predetermined threshold, i) the specific subchannel can be determined to be a subchannel being used by another UE, or ii) the specific subchannel can be determined to be a subchannel that cannot be used as a candidate resource for data transmission.

Figure 10:
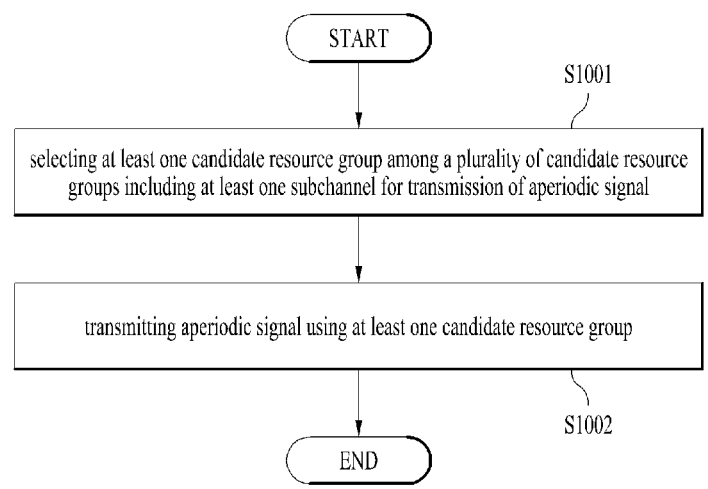
FIG. 10 is a flowchart illustrating operations of a method according to the embodiments of the present disclosure.

FIG. 10 is a flowchart illustrating operations of a method according to the embodiments of the present disclosure.

Referring to FIG. 10, the method for allowing a first UE to transmit a signal in a wireless communication system may include selecting (S1001), by the first UE, at least one candidate resource group from among a plurality of candidate resource groups each including at least one subchannel needed to transmit an aperiodic signal, and transmitting (S1002), by the first UE, the aperiodic signal to a second UE using the at least one candidate resource group. In this case, the at least one candidate resource group can be selected based on the sensing result of the first UE associated with the plurality of candidate resource groups.

For example, the method according to one embodiment of the present disclosure may include selecting (Step 1), by a UE, a subset (e.g., a candidate resource group) to be used by the UE through sensing, and selecting (Step 2), by the UE, resources (e.g., a subchannel) to be actually used in a subset (e.g., a candidate resource group) of the selected resources.

In legacy Rel. 12 and Rel. 13 D2D communication, a UE may decide a resource pool to be used by the UE from among a plurality of resource pools established by a network (e.g., a base station (BS) such as eNB or gNB) in consideration of purposes of the plurality of resource pools. For example, the UE may determine whether the resource pool is a normal pool, an exceptional pool, a public safety pool, or a commercial pool. In Rel. 14 V2X communication, a resource pool may be determined according to UE positioning information. As a result, a near far effect between one UE and the other UE can be reduced.

The method proposed by the present disclosure includes allowing the UE to recognize consecutive resources in time and/or frequency domains as one resource group, performing such sensing in units of a resource group, selecting a resource group, and selecting actual Tx resources within the selected resource group. In other words, the proposed method can also be represented by the following method. In more detail, a resource pool can be determined using a method for deciding a resource pool used in the legacy Rel. 12, Rel. 13, and Rel. 14 sidelink, and transmission (Tx) resources can be determined in the selected resource unit after the sensing operation has been performed in units of a predetermined resource within the selected resource pool.

In Step 2 of selecting resources (e.g., a subchannel) to be actually used within a subset (e.g., a candidate resource group) of the above selected resources, the Tx UE can indicate whether to use a specific slot. In this case, the Tx UE may determine resources to be actually used at random from among all resources, or may determine resources to be actually used at random except for some resources that are considered to be used by another UE.

The Tx UE may select at least one subchannel based on the sensing result, and may use the selected subchannel as Tx resources. In addition, the UE may transmit the aperiodic signal (e.g., aperiodic traffic) using the selected Tx resources. At this time, the subchannel and a timing offset can be determined by the following rules.

If resource (re)selection is triggered at the N-th slot, the sensing operation can be performed at [n–a, n–b]-th slots. The remaining candidate resource groups other than resources that are scheduled to be used by another UE based on the sensing result may be determined in numerical descending order of distances spaced apart from the N-th slot. The above-mentioned operation may be performed at a specific time at which resource (re)selection is triggered. In this case, the candidate resource group may include consecutive subchannels and a slot. However, if a UE designed to periodically use a specific resource attempts to use subchannel(s) of a specific slot, the corresponding resources may be excluded from the candidate resource group, or the corresponding slot in the candidate resource group may not be used for transmission. For example, as shown in FIG. 10, the step S1001 of selecting at least one of the candidate resource groups may include selecting some candidate resource groups other than a candidate resource group colliding with resources needed to transmit a periodic signal from among the plurality of candidate resource groups.

Here, the candidate resource group may refer to either a set (or aggregate) of resources that can be reserved by the Tx UE, or a set (or aggregate) of resources to be used by the Tx UE. The candidate resource group may be a unit including at least one subchannel. The UE in which (re)selection of resources is triggered may determine a plurality of candidate resource groups based on the sensing result. The triggered UE may select at least one candidate resource group from among the plurality of candidate resource groups, and may apply the selected candidate resource group to data transmission. In addition, the triggered UE may select some subchannels from among one or more subchannels included in the selected candidate resource group, and may transmit signals through the selected subchannels.

For example, the candidate resource group may include consecutive slots and/or consecutive subchannels. In another example, the slots and/or the subchannels may be discontinuously configured in resources (periodically) reserved by another UE. The UE may decide a candidate resource group through sensing, and may indicate resources to be actually used in the decided candidate resource group. After lapse of the N-th slot, subchannels that are not used (or indicated) by another UE can be used to determine consecutive candidate resource groups in the time domain. For example, specific subchannel(s) may be set to one candidate resource group at [n+x1, n+x2] slots. At this time, x1, x2, and/or x2−x1 may be set to predetermined value(s). In this case, when the UE scheduled to select resources selects the plurality of subchannels in the frequency domain, one resource group may be constructed in units of a plurality of subchannels.

Figure 11:
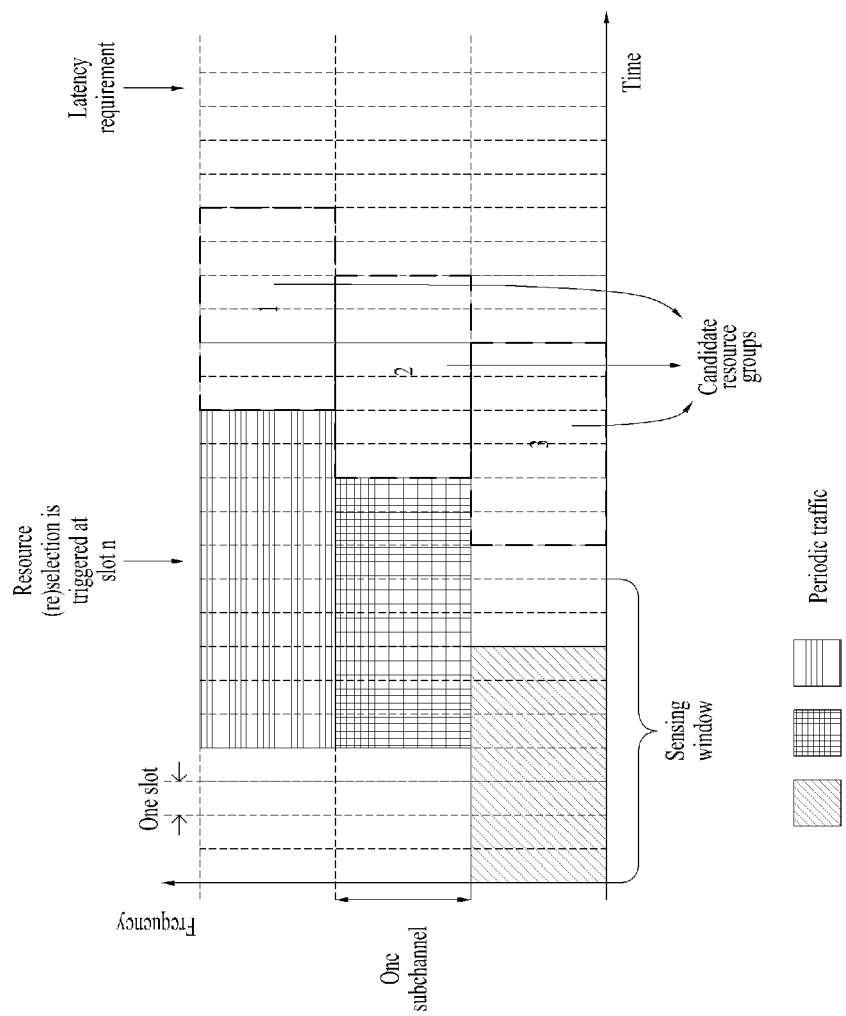
FIG. 11 is a conceptual diagram illustrating the method according to the present disclosure.

FIG. 11 is a conceptual diagram illustrating the method according to the present disclosure.

FIG. 11 is a conceptual diagram illustrating a method for constructing a candidate resource group for each subchannel.

For example, the Tx UE or network (e.g., BS such as eNB or gNB) may establish (or form) a candidate resource group for each subchannel within a range for satisfying latency requirements, may select one of the candidate resource groups of individual subchannels, may use the selected candidate resource group as a Tx resource, and may inform the Rx UE of the selected candidate resource group through a control signal (control information). In the front K slots of each candidate resource group, a control signal (control information) indicating which slot is the last reservation slot can be signaled. At this time, when constructing the candidate resource group, it is desirable that as many candidate resource groups as possible be consecutively designated in the slot being used by another UE. As a result, latency can be reduced as much as possible, and some of the resources can be prevented from being fragmented. A candidate resource group may be established just after the slot being used by another UE, and the earliest time may be allocated to a predetermined slot located after the slot in which the resource (re)selection is triggered. If (re)selection is triggered at the N-th slot, the earliest slot capable of constructing the candidate resource group from among the plurality of slots may be set to the (n+x)-th slot. In this case, 'x' may be fixed, or may be changed differently according to UE capability or UE implementation.

Referring to FIG. 11, it can be recognized that a third candidate resource group (No. 3 candidate resource group) cannot use consecutive resources because resource (re) selection is triggered at a slot just before the third candidate resource group. The UE may select the first and/or second candidate resource groups (i.e., No. 1 and/or No. 2 candidate resource groups) shown in FIG. 11, or may select at least one subchannel included in the first and/or second candidate resource group. In addition, the UE may receive signals using the selected candidate resource group and/or the selected subchannel.

Figure 12:
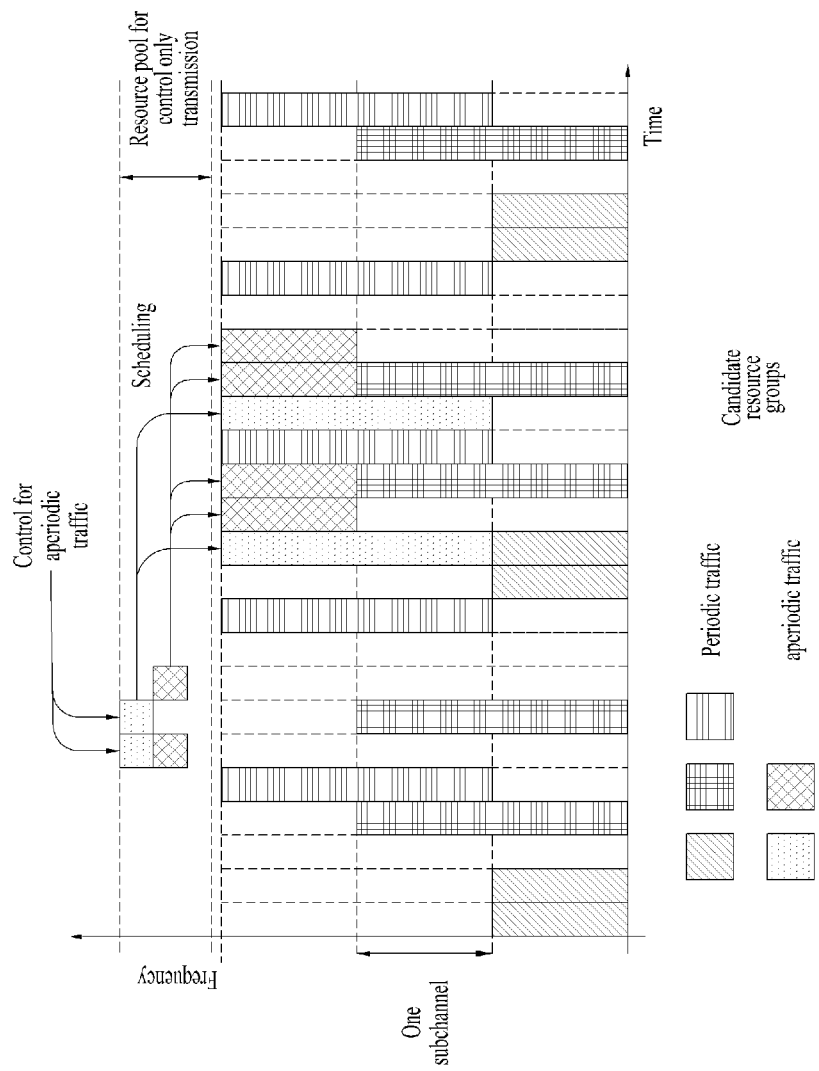
FIG. 12 is a conceptual diagram illustrating the method according to the present disclosure.

FIG. 12 is a conceptual diagram illustrating the method according to the present disclosure.

The present disclosure proposes a method for transmitting a control signal earlier than a data signal in a situation in which a packet is aperiodically generated. For example, the aperiodic signal shown in steps S1001 and S1002 shown in FIG. 10 may include control information and data information. Time resources needed to transmit the control information may be established to be transmitted earlier than time resources needed to transmit the data information. The candidate resource group needed to transmit the control information may be established differently from the candidate resource group needed to transmit the data information.

The control signal and the data signal may be subjected to TDM(Time Division Multiplexing), such that the TDM resultant signals can be transmitted. The control signal may be transmitted in advance, such that the control signal may indicate that the data signal will be transmitted at a specific resource after lapse of a predetermined time. Alternatively, when the data signal is transmitted, the control signal may be transmitted once more together with the data signal for the UE that has not received the previous control signal. In this case, either for the UE in which the packet is aperiodically generated, or for the UE designed to perform TDM processing on the control signal and the data signal and transmit the TDM resultant signals, a new control signal region (PSCCH resource pool) may be separately (pre-) configured by the network (e.g., BS such as eNB or gNB). A predetermined region of frequency resources may be a resource region reserved for the UE designed to transmit the control signal for such aperiodic traffic. FIG. 12 is a conceptual diagram illustrating the method according to the present disclosure. Alternatively, the resource region may be established for the UE designed to transmit the control signal only, thereby preventing collision with a control signal region used by the UE which performs FDM on the control signal and the data signal and then transmits the FDM resultant signals. If the UE designed to periodically transmit the packet transmits the control signal and the data signal at the same slot (i.e., if the UE performs SA (scheduling assignment) and data FDM), and if the other UE designed to transmit the aperiodic packet transmits only the control signal at a specific subchannel, it is impossible to transmit the data signal to the corresponding subchannel, resulting in a waste of resources. Accordingly, a resource region for transmitting the control signal dedicated for the UE designed to transmit the control signal should be configured (or pre-configured) by the network (e.g., BS such as eNB or gNB). The UE designed to transmit the control signal at a time earlier by a predetermined time than the data signal may not receive another data signal through transmission of the control signal. In addition, if two or more UEs having transmitted the control signal transmit the control signal at the same slot, the UEs may not receive the control signal.

In order to address the above-mentioned issues, the present disclosure proposes a method for allowing the UE configured to transmit only the control signal to transmit the control signal at N different slots. In this case, N may be predetermined or may be determined by the Tx UE. In this case, various methods i), ii), and iii) for selecting resources needed to transmit the control signal for each UE can be used. In more detail, i) the method may be determined through sensing, ii) the method may be determined at random, and iii) the method may be determined by a predefined hopping pattern. For example, when frequency resources are classified into N control signal resources, the UE having transmitted the control signal at the first frequency resource (No. 1 frequency resource) of the N-th slot can transmit the control signal at the first frequency resource (No. 1 frequency resource) of the (n+1)-th slot, and the UE having transmitted the control signal at the second frequency resource (No. 2 frequency resource) of the n-th slot can transmit the control signal using the second frequency resource (No. 2 frequency resource) at the (n+2)-th slot. In this case, a PSCCH of Rel. 12 and Rel. 13 D2D or a hopping pattern of Type 2B discovery can be used (see 3GPP TS 36.213). The previously transmitted control signal may indicate a use time to be used in a subsequent process, and the position of frequency resources to be used in a subsequent process. In this case, if a priority (e.g., PPPP) is high or a necessary reliability (e.g., PPPR) is high, a time gap between the control signal and the data signal may increase. If a high priority or a high reliability is required, necessary resources are occupied in advance so that another UE can avoid collision with the corresponding resources. For example, the step S1001 of selecting at least one of the plurality of candidate resource groups may include determining a time gap between a candidate resource group needed to transmit the control information and the other candidate resource group needed to transmit the data information based on either priority or reliability of the aperiodic signal.

In a situation in which a specific UE is considered to transmit a specific resource for aperiodic traffic transmission and reserves resource usage by primarily transmitting a PSCCH, if another UE indicates the same resources to transmit a higher-priority packet, the UE may drop a lower-priority packet that has previously indicated the resources. However, the lower-priority packet may drop too frequently. In order to address the above-mentioned issues, the higher priority, the higher the time gap between the control signal and the data signal. From the viewpoint of a specific UE, a (time) gap between the last Tx control signal and the initial Tx data signal may be changed according to PPPP and/or PPPR. A (time) gap based on PPPP and/or PPPR i) may be signaled by the network (e.g., BS such as eNB or gNB), ii) may be predefined, or iii) may be autonomously determined by the UE.

A peripheral UE may select the remaining resources other than some resources reserved by a higher-priority packet than the packet to be transmitted by the peripheral UE. That is, the peripheral UE may select necessary resources from among other resources other than resources reserved by the higher-priority packet than the packet to be transmitted by the peripheral UE.

If the same priority-packet indicates the same resources, the UE can perform the following selection.

If the remaining time compared to the remaining latency requirement is shorter than the time allocated to the UE, the operation of transmitting data at the indicated resources may be dropped (or omitted), and other resources may be selected. To this end, each UE may signal data Tx resources to the control signal, such that the remaining latency budget (i.e., the remaining time compared to the latency requirement) can be signaled after completion of data transmission. For example, the step S1001 for selecting at least one of the candidate resource groups shown in FIG. 10 may include selecting at least one of the candidate resource groups based on either latency requirement for the aperiodic signal or the remaining time compared to the latency requirement.

If the packet is (aperiodically) generated, the embodiments of the present disclosure propose a method of limiting the size of frequency resources available for such aperiodic packet, a method for repeatedly transmitting the packet in the time domain at least a predetermined number of times, a method of indicating consecutive resource regions, or a method for combining the above-mentioned methods with each other.

In this case, the aperiodic packet may be i) a packet that is not generated within a predetermined time section after transmission of the previous packet, ii) a packet that is aperiodically generated in a higher layer or is generated in a higher layer in an event triggered manner, iii) a packet that requests a specific PPPP (or higher) or a specific PPPP (or less), or iv) a packet that requests a specific PPPR (or higher) or a specific PPPR (or less). For example, the periods generated when the packet is generated may be averaged to predict a generation time of the next packet. At this time, if the packet is generated in a range outside the predicted range, it is impossible for the corresponding packet to use resources reserved in PHY/MAC layers. In this case, for stable transmission, the above-mentioned control signal is transmitted at a time earlier by a predetermined time from a reference time point. As a result, the UE may request preemption from another UE, may decide a scheduled transmission range, and may enable another UE to stably avoid the decided range.

If the UE uses the subchannel only once during transmission of the aperiodic packet, the UE may inform the peripheral UE of specific information indicating that the subchannel will be (consecutively) used for a predetermined window or some resources will be used for the predetermined window. The above-mentioned operation can be applied to another UE designed to transmit or receive aperiodic traffic (or aperiodic packet). Therefore, if the sensing result of a specific subchannel indicates that the subchannel is being used by another UE (or if a specific subchannel is determined to be unavailable resources or if a high RSSI is measured due to high interference), this means that the corresponding subchannel is being used by another UE for a predetermined time. For example, if it is determined that a specific subchannel is being used at the slot 'N', it is assumed that such determination is maintained until the slot (n+k) is reached. In this case, the value of 'k' i) may be signaled by a control signal of the Tx UE, ii) may be determined by implementation of the Rx UE (for example, if the N-th slot is being used by another UE, it is assumed that such determination is maintained until the slot (n+k) is reached), or may be changed by CBR (Channel Busy Ratio) measurement (for example, if a CBR is high, it is assumed that such determination is maintained until the slot (n+k1) is reached, and if a CBR is low, it is assumed that such determination is maintained until the slot (n+k2) is reached), and iii) may be a value that is decided in a resource-pool-specific manner (here, the resource-pool-specific value is signaled by the network (e.g., BS such as eNB or gNB) for each resource pool).

For example, the size of the slot duration in which resources are consecutively and temporally (on average) reserved for each resource pool may be signaled to the UE through physical layer signaling or higher layer signaling (to this end, PSCCH may include specific information indicating how many subsequent slots will be used to reserve the corresponding subchannel), or such information may be predetermined for each resource pool. In this case, resources (e.g., the value of 'k') of a specific duration are signaled by PSCCH, and the corresponding subchannel may determine whether to reserve/use resources using the value indicated by the PDSCCH of the Tx UE.

In accordance with one embodiment of the present disclosure, if PSSCH is not transmitted at a specific subchannel or slot, RSRP of the PDSCCH scheduling the corresponding subchannel is measured such that the measured PSCCH RSRP can be converted into PSSCH RSRP.

For example, the step S1001 of selecting at least one of the candidate resource groups shown in FIG. 10 may select at least one of the candidate resource groups based on either latency requirement for the aperiodic signal or the remaining time compared to the latency requirement. In this case, the control information can be transmitted through a PSCCH (Physical Sidelink Control Channel), and the data information can be transmitted through a PSSCH (Physical Sidelink Shared Channel).

RSRP (Reference Signal Received Power) of the PSSCH may be calculated based on RSRP of the PSCCH. The PSSCH RSRP may be obtained from the PSCCH RSRP in consideration of two factors (i) and (ii) of the PSCCH RSRP based on the ratio of the PSCCH RB size to the PSSCH RB size. In this case, the first factor (i) may be a scaling (e.g., linear scale) factor, and the second factor (ii) may be an offset (e.g., dB scale). The present disclosure may first transmit the PSCCH, may then transmit the PSSCH, such that the operation of deriving the PSSCH RSRP from the PSCCH RSRP may be meaningful as described above.

For example, the RSRP of the PSSCH may be calculated in consideration of the ratio of the size of resources needed for PSCCH transmission to the size of resources needed for PSSCH transmission. For example, if the RSRP of the PSCCH having the size of two RBs (2RB) is denoted by X[dBm], the RSRP of the PSSCH having the size of 4RB can be converted into (X−3)[dBm]. Here, it is assumed that power of the PSSCH and power of the PSCCH can be maintained. Since the RB size of the PSSCH is two times larger than the RB size of the PSCCH, average power for each RE in PSSCH is half the average power for each RE in PSCCH, such that the average power can be reduced by 3 dB. As a result, the RSRP of the PSSCH can be calculated as described above.

In another example, the RSRP of the PSSCH may be calculated in consideration of at least one of i) Tx power of PSCCH and PSSCH and ii) the ratio of PSSCH Tx power to PSCCH Tx power. For example, PSCCH may include at least one of i) PSSCH Tx power information and/or PSCCH Tx power information, and ii) the ratio of PSCCH Tx power to PSSCH Tx power. As a result, the RSRP of the PSCCH can be calculated based on the above-mentioned information. After the PSCCH RSRP is first measured, the PSSCH RSRP can be derived from the PSCCH RSRP using the ratio of PSCCH Tx power to PSSCH Tx power. As a result, the RSRP for use in resources indicated by the UE designed to transmit the PDCCH only may be predicted so that the sensing operation can be smoothly performed.

The present disclosure provides the following technical effects based on any one of the above-mentioned methods or combination of the above-mentioned methods.

First, the number of bits indicating resources to be actually used within a specific resource group can be reduced. A maximum resource range is first established, and the slot and/or symbols to be actually used in the established resource range can be indicated. If resources can be used in all slots belonging to the resource pool, the number of bits needed to indicate resource allocation information may increase.

Second, from the standpoint of another UE, it is assumed that a specific resource group is always used for other UEs and the sensing operation is performed on this assumption. The UE may average the sensing results obtained from the resource group, and may select a resource group based on a specific value (e.g., maximum/minimum/intermediate values in the resource group) measured at a specific subchannel.

Third, from the standpoint of the Tx UE, after a specific resource group is selected, it is assumed that resources are not used by another UE belonging to the corresponding resource group, such that such resources can be freely selected. In this case, in order to determine whether another UE uses the same resource group (or in order to receive Tx signals from another subchannel), no data may be transmitted through some slots or symbols of the slot. The Tx UE may signal a control signal to peripheral UEs such that the peripheral UEs having received the control signal can recognize which slot is not used for data transmission or which symbol is not used for data transmission.

Fourth, if transmission (Tx) resources are selected in specific consecutive resource groups, a gain in channel estimation can be obtained. Since consecutive resources are used, a gain in channel estimation/interpolation between slots (i.e., interslot) can be obtained.

Examples of a Communication System to which the Present Disclosure is Applied

Various descriptions, functions, procedures, proposals, methods and/or operational flowcharts of the present disclosure disclosed in this document are applicable, but limited, to various fields requiring wireless communication/connection (e.g., 5G) between devices.

Hereinafter, examples will be illustrated in more detail with reference to the drawings. In the following drawings/description, the same reference numerals may exemplify the same or corresponding hardware blocks, software blocks, or functional blocks, unless otherwise indicated.

Figure 13:
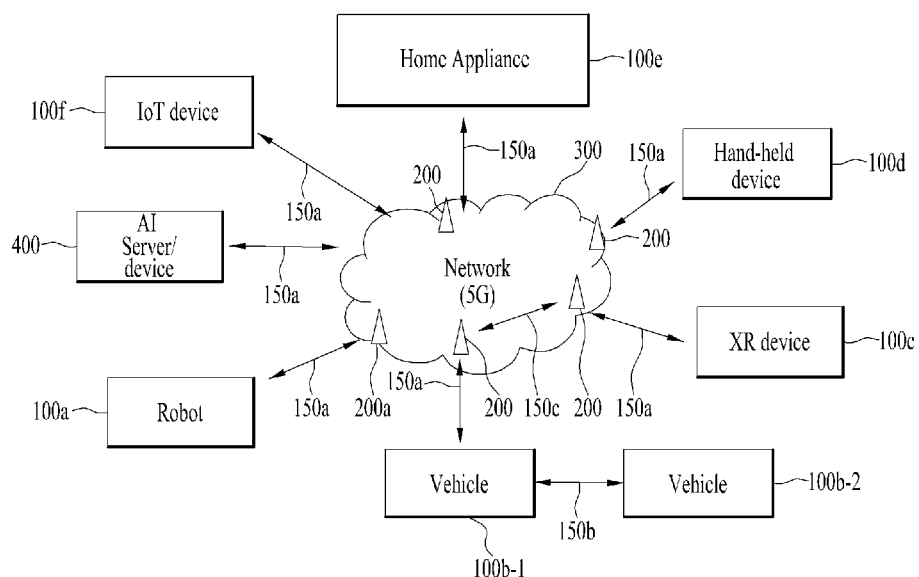
FIG. 13 is a diagram illustrating a communication system to which one embodiment of the present disclosure can be applied.

FIG. 13 illustrates a communication system applied to the present disclosure. Referring to FIG. 13, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 14:
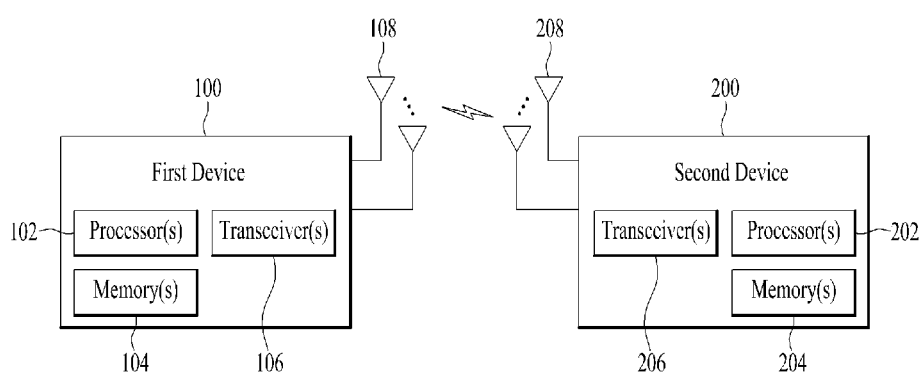
FIG. 14 is a block diagram illustrating a wireless device to which one embodiment of the present disclosure can be applied.

FIG. 14 is a block diagram illustrating a wireless device to which one embodiment of the present disclosure can be applied.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor (s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit to which the Present Disclosure is Applied

Figure 15:
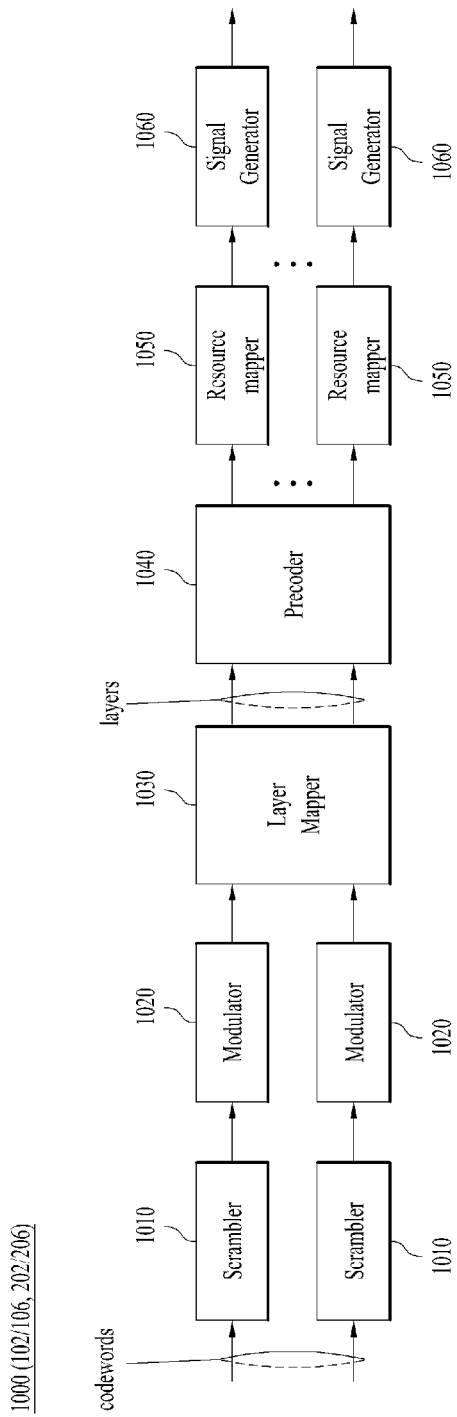
FIG. 15 is a block diagram illustrating a signal processing circuit for transmission (Tx) signals to which one embodiment of the present disclosure can be applied.

FIG. 15 is a block diagram illustrating a signal processing circuit 1000 for transmission (Tx) signals to which one embodiment of the present disclosure can be applied.

Referring to FIG. 15, the signal processing circuit 1000 may include a scrambler 1010, a modulator 1020, a layer mapper 1030, a precoder 1040, a resource mapper 1050, and a signal generator 1060. The operations/functions shown in FIG. 15 may be performed by the processors 102 and 202 and/or the transceivers 106 and 206 shown in FIG. 14, without being limited thereto. Hardware elements shown in FIG. 15 may be implemented by the processors 102 and 202 and/or the transceivers 106 and 206 shown in FIG. 14. For example, the blocks 1010 to 1060 may be implemented by the processors 102 and 202. In addition, the blocks 1010 to 1050 may be implemented by the processors 102 and 202 shown in FIG. 14, and the block 1060 may be implemented by the transceivers 106 and 206 shown in FIG. 14.

The codeword may be converted into a radio signal (or a radio frequency (RF) signal) through the signal processing circuit 1000 shown in FIG. 15. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK(pi/2-Binary Phase Shift Keying), m-PSK (m-Phase Shift Keying), m-QAM (m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an Inverse Fast Fourier Transform (IFFT) module, a Cyclic Prefix (CP) inserter, a Digital-to-Analog Converter (DAC), a frequency uplink converter, etc.

The signal processing steps for reception (Rx) signals in the wireless device may be arranged in the reverse order of the signal processing steps 1010 to 1060 shown in FIG. 15. For example, the wireless devices 100 and 200 (shown in FIG. 4) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a Fast Fourier Transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

Use Cases of Wireless Devices to which the Present Disclosure is Applied

Figure 16:
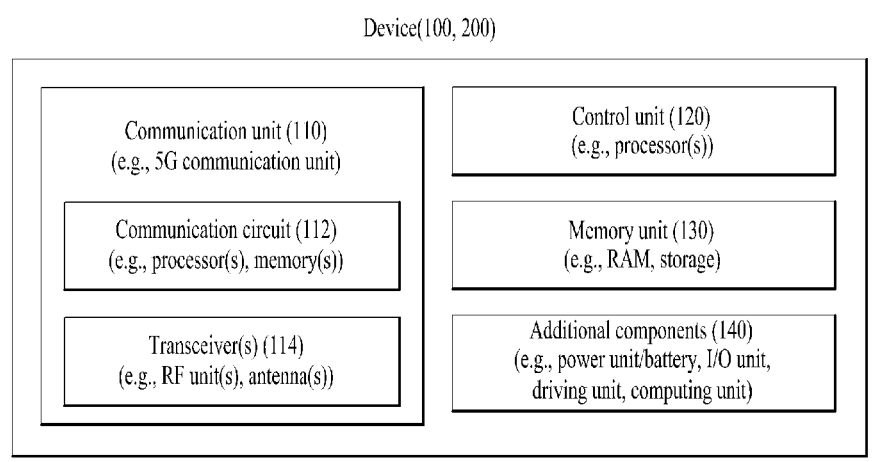
FIG. 16 is a block diagram illustrating a wireless device to which another embodiment of the present disclosure can be applied.

FIG. 16 illustrates another example of a wireless device applied to the present disclosure. The wireless device may be implemented in various forms according to a use case/service (refer to FIGS. 13, 17, 18 and 19).

Referring to FIG. 16, the wireless devices 100 and 200 correspond to the wireless devices 100 and 200 of FIG. 14, and may be composed of various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or one or more antennas 108 and 208 of FIG. 30. The control unit 120 is electrically connected to the communication unit 110, the memory unit 130, and the additional components 140 and controls overall operations of the wireless devices. For example, the controller 120 may control the electrical/mechanical operation of the wireless device based on the programs/code/commands/information stored in the memory unit 130. In addition, the control unit 120 may transmit the information stored in the memory unit 130 to an external part (e.g., another communication device) via the communication unit 110 through a wireless/wired interface, or store, in the memory unit 130, information received through the wireless/wired interface from an external part (e.g., another communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire, and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphics processor, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Hereinafter, an example implementation of FIG. 16 will be described in detail with reference to the drawings.

Example of Hand-Held Device to which the Present Disclosure is Applied

Figure 17:
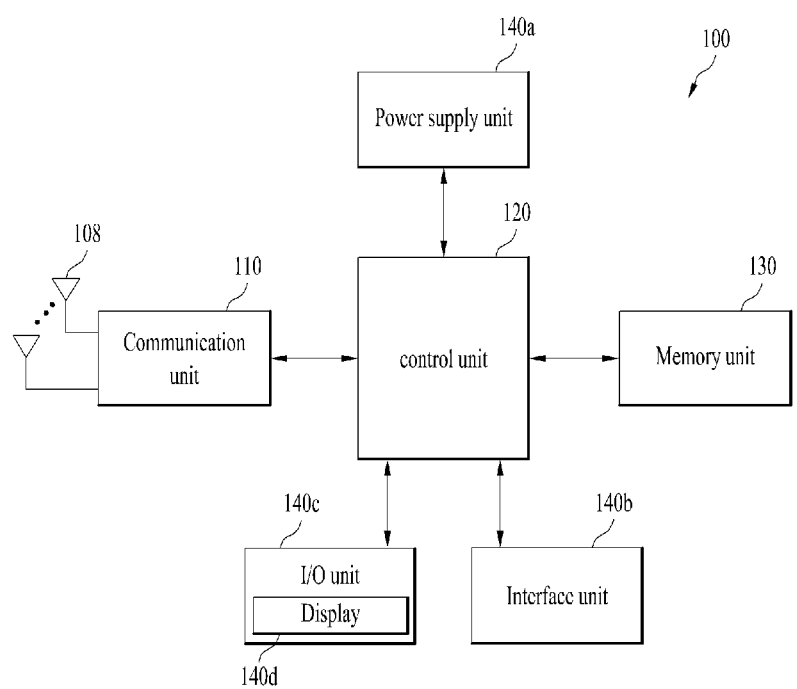
FIG. 17 is a block diagram illustrating a hand-held device to which another embodiment of the present disclosure can be applied.

FIG. 17 is a block diagram illustrating a hand-held device 100 to which another embodiment of the present disclosure can be applied. The hand-held device may include a smartphone, a tablet (also called a smartpad), a wearable device (e.g., a smartwatch or smart glasses), and a portable computer (e.g., a laptop). The hand-held device 100 may be referred to as a mobile station (MS), a user terminal (UT), a mobile subscriber station (MSS), a subscriber station (SS), an advanced mobile station (AMS), or a wireless terminal (WT).

Referring to FIG. 17, the hand-held device 100 may include an antenna unit 108, a communication unit 110, a control unit 120, a memory unit 130, a power supply unit 140*a*, an interface unit 140*b*, and an input/output (I/O) unit 140*c*. The antenna unit 108 may be configured as a part of the communication unit 110. The blocks 110 to 130/140a to 140c correspond to the blocks 110 to 130/140 of FIG. 16, respectively.

The communication unit 110 may transmit and receive signals (e.g., data and control signals) to and from another wireless device and a BS. The control unit 120 may perform various operations by controlling elements of the hand-held device 100. The control unit 120 may include an application processor (AP). The memory unit 130 may store data/parameters/programs/code/commands required for operation of the hand-held device 100. Further, the memory unit 130 may store input/output data/information. The power supply unit 140a may supply power to the hand-held device 100, and include a wired/wireless charging circuit and a battery. The interface unit 140b may support connection between the hand-held device and other external devices. The interface unit 140b may include various ports (e.g., an audio I/O port and a video I/O port) for connection to external devices. The I/O unit 140c may receive or output video information/signal, audio information/signal, data, and/or user-input information. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signals in the memory unit 130. The communication unit 110 may convert the information/signals into radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 18:
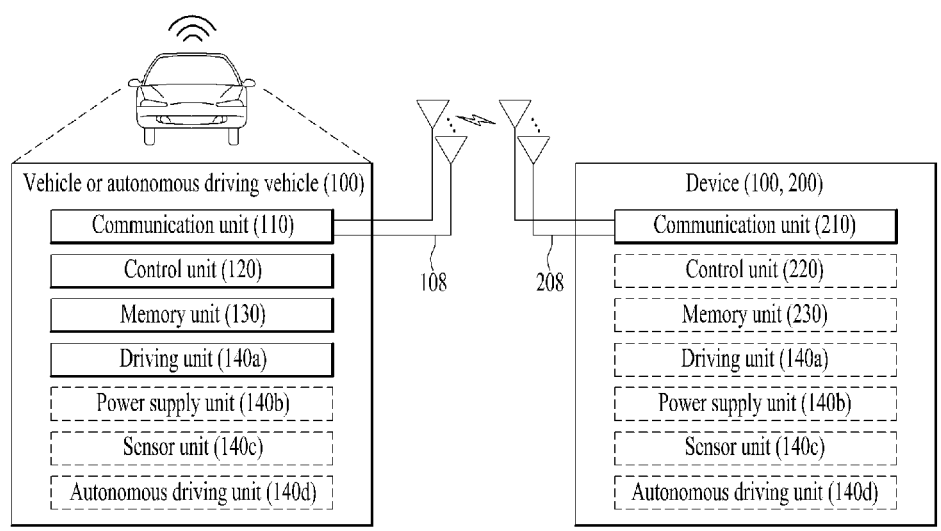
FIG. 18 is a block diagram illustrating a vehicle or an autonomous driving vehicle to which another embodiment of the present disclosure can be applied.

Examples of Vehicles or Autonomous Vehicles to which the Present Disclosure is Applied FIG. 18 illustrates an example vehicle or autonomous driving vehicle applied to the present disclosure. The vehicle or autonomous driving vehicle may be implemented as a mobile robot, a vehicle, a train, a manned/unmanned aerial vehicle (AV), or a ship.

Referring to FIG. 18, the vehicle or autonomous driving vehicle 100 may include an antenna unit 108, a communication unit 110, a control unit 120, a driving unit 140a, a power supply unit 140b, and a sensor unit 140c, and an autonomous driving unit 140d. The antenna unit 108 may be configured as a part of the communication unit 110. The blocks 110, 130, and 140a to 140c correspond to the blocks 110, 130, and 140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU).

The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

AR/VR and Vehicle Examples to which the Present Disclosure is Applied

Figure 19:
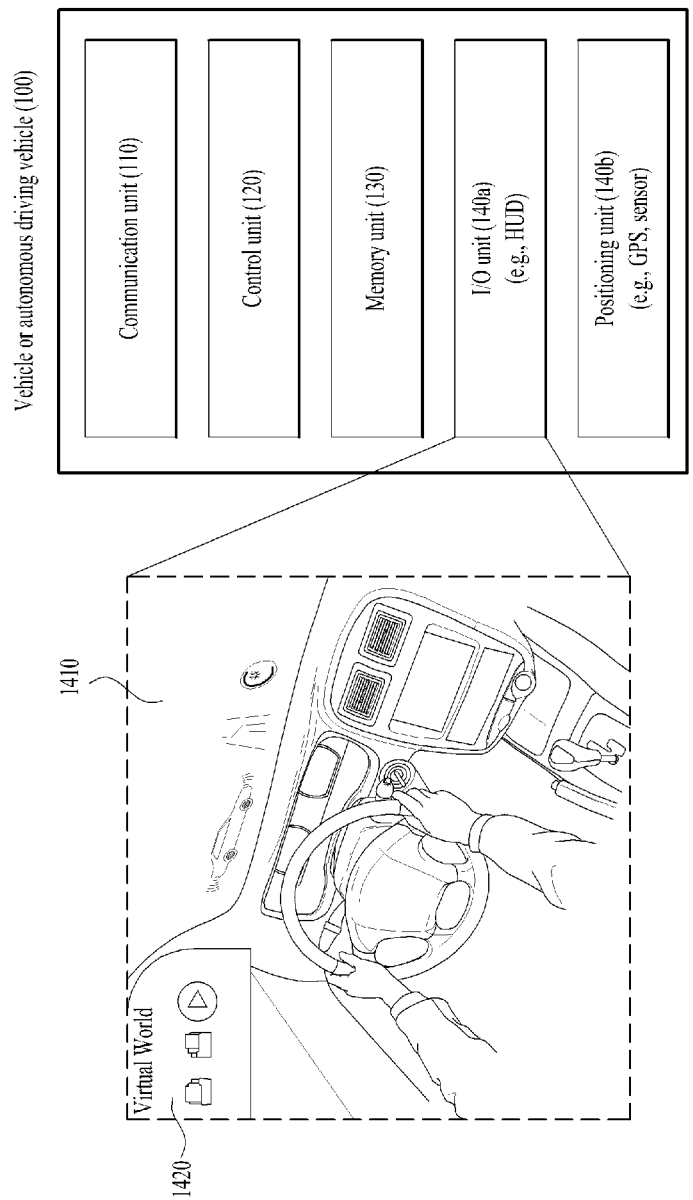
FIG. 19 is a block diagram illustrating a vehicle to which another embodiment of the present disclosure can be applied.

FIG. 19 illustrates a vehicle applied to the present disclosure. The vehicle may also be implemented as a transportation means, a train, an aircraft, or a ship.

Referring to FIG. 19, the vehicle 100 may include a communication unit 110, a control unit 120, a memory unit 130, an input/output unit 140a, and a positioning unit 140b. Here, blocks 110 to 130/140a to 140b correspond to the blocks 110 to 130/140 of FIG. 16, respectively.

The communication unit 110 may transmit and receive signals (e.g., data, control signals, etc.) to and from other vehicles or external devices such as a base station. The controller 120 may perform various operations by controlling the components of the vehicle 100. The memory unit 130 may store data/parameters/programs/codes/commands supporting various functions of the vehicle 100. The input/output unit 140a may output an AR/VR object based on information in the memory unit 130. The input/output unit 140a may include a HUD. The positioning unit 140b may acquire location information about the vehicle 100. The location information may include absolute location information about the vehicle 100, location information within a driving lane, acceleration information, and location information with respect to nearby vehicles. The positioning unit 140b may include a GPS and various sensors.

As an example, the communication unit 110 of the vehicle 100 may receive map information, traffic information, and the like from an external server and store the same in the memory unit 130. The positioning unit 140b may acquire vehicle location information through the GPS and various sensors and store the vehicle location information in the memory unit 130. The control unit 120 may generate a virtual object based on the map information, traffic information, vehicle location information, and the like, and the input/output unit 140a may display the generated virtual object on the inner side of the windshield of the vehicle. In addition, the controller 120 may determine whether the vehicle 100 is operating normally within a driving lane based on the vehicle location information. When the vehicle 100 abnormally deviates from the driving lane, the control unit 120 may display a warning on the windshield of the vehicle through the input/output unit 140a. In addition, the controller 120 may broadcast a warning message about a driving abnormality to nearby vehicles through the communication unit 110. Depending on the situation, the controller 120 may transmit location information about the vehicle and information about driving/vehicle abnormalities to a related organization through the communication unit 110.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this document, embodiments of the present disclosure have been described mainly based on a signal transmission/reception relationship between a terminal and a base station. Such a transmission/reception relationship is applied to signal transmission/reception between a terminal and a relay or between a base station and a relay in in the same/similar manner. In some cases, a specific operation described in this document as being performed by the base station may be performed by an upper node thereof. That is, it is apparent that various operations performed for communication with a terminal in a network including a plurality of network nodes including a base station may be performed by the base station or network nodes other than the base station. The base station may be replaced with terms such as fixed station, Node B, eNode B (eNB), gNode B (gNB), access point, or the like. In addition, the terminal may be replaced with terms such as User Equipment (UE), Mobile Station (MS), Mobile Subscriber Station (MSS), or the like.

The examples of the present disclosure may be implemented through various means. For example, the examples may be implemented by hardware, firmware, software, or a combination thereof. When implemented by hardware, an example of the present disclosure may be implemented by one or more application specific integrated circuits (ASICs), one or more digital signal processors (DSPs), one or more digital signal processing devices (DSPDs), one or more programmable logic devices (PLDs), one or more field programmable gate arrays (FPGAs), one or more processors, one or more controllers, one or more microcontrollers, one or more microprocessor, or the like.

When implemented by firmware or software, an example of the present disclosure may be implemented in the form of a module, a procedure, or a function that performs the functions or operations described above. Software code may be stored in a memory unit and executed by a processor. The memory unit may be located inside or outside the processor, and may exchange data with the processor by various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein The above-mentioned embodiments of the present disclosure are applicable to various mobile communication systems.

What is claimed is:

1. A method of transmitting, by a first user equipment (UE), a signal in a wireless communication system, the method comprising:
   selecting, by the first UE, a first candidate resource group for a control signal and a second candidate resource group for a data signal, from among a plurality of candidate resource groups each including at least one subchannel;
   transmitting, by the first UE to a second UE through a physical sidelink control channel (PSCCH), the control signal based on first time resources in the first candidate resource group; and
   transmitting, by the first UE to the second UE through a physical sidelink shared channel (PSSCH), the data signal based on second time resources in the second candidate resource group,
   wherein the first candidate resource group and the second candidate resource group are selected based on a sensing result of the first UE associated with the plurality of candidate resource groups,
   wherein the first time resources for the control signal are located before the second time resources for the data signal, and
   wherein a reference signal received power (RSRP) of the PSSCH is calculated based on a RSRP of the PSCCH.

2. The method according to claim 1, wherein the RSRP of the PSCCH is calculated based on a ratio between a PSCCH resource amount and a PSSCH resource amount.

3. The method according to claim 1, wherein the RSRP of the PSSCH is calculated based on at least one of first transmission power of the PSCCH, second transmission power of the PSSCH, or a ratio of the second transmission power to the first transmission power.

4. The method according to claim 1, wherein selecting the first candidate and the second candidate comprises:
   determining, by the first UE, a time gap between the first candidate resource group and the second candidate resource group based on either priority information or reliability information.

5. The method according to claim 1, wherein the first and the second candidate resource groups are selected based on latency requirement.

6. A first user equipment (UE) in a wireless communication system, the first UE comprising:
- a transceiver; and
- a processor configured to perform operations comprising:
  - selecting a first candidate resource group for a control signal and a second candidate resource group for a data signal, from among a plurality of candidate resource groups each including at least one subchannel,
  - transmitting, to a second UE through a physical sidelink control channel (PSCCH), the control signal based on first time resources in the first candidate resource group,
  - transmitting, to the second UE through a physical sidelink shared channel (PSSCH), the data signal based on second time resources in the second candidate resource group,
- wherein the first candidate resource group and the second candidate resource group are selected based on a sensing result of the first UE associated with the plurality of candidate resource groups,
- wherein the first time resources for the control signal are located before the second time resources for the data signal, and
- wherein a reference signal received power (RSRP) of the PSSCH is calculated based on a RSRP of the PSCCH.

7. The first UE according to claim 6, wherein
the first UE is configured to communicate with at least one of a mobile terminal, a network, or a device of an autonomous vehicle.

8. The first UE user equipment (UE) according to claim 6, wherein
the first UE is configured to implement at least one advanced driver assistance system (ADAS) function based on a signal for controlling movement of the first UE.

9. The first UE according to claim 7, wherein
the operations further comprise:
- receiving a user input signal from a user, and
- switching (i) a driving mode of the device of the autonomous vehicle from an autonomous driving mode to a manual driving mode or (ii) a driving mode of the device of the autonomous vehicle from the manual driving mode to the autonomous driving mode.

10. The first UE according to claim 6, wherein
the first UE is autonomously driven based on external object information, and
wherein the external object information includes at least one of information indicating presence or absence of an object, position information of the object, information about a distance between the first UE and the object, or information about a relative speed between the first UE and the object.

11. The first UE according to claim 6, wherein the first UE is capable of communicating with at least one of another UE, a UE related to an autonomous driving vehicle, a base station or a network.

* * * * *